(12) United States Patent
Kawarada

(10) Patent No.: US 10,904,425 B2
(45) Date of Patent: Jan. 26, 2021

(54) IMAGE PROCESSING APPARATUS, CONTROL METHOD THEREFOR, AND STORAGE MEDIUM FOR EVALUATING A FOCUSING STATE OF IMAGE DATA

(71) Applicant: CANON KABUSHIKI KAISHA, Tokyo (JP)

(72) Inventor: Masahiro Kawarada, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/179,625

(22) Filed: Nov. 2, 2018

(65) Prior Publication Data
US 2019/0141254 A1 May 9, 2019

(30) Foreign Application Priority Data
Nov. 6, 2017 (JP) .................................. 2017-213864

(51) Int. Cl.
*H04N 5/232* (2006.01)
*G06K 9/00* (2006.01)
*H04N 5/369* (2011.01)

(52) U.S. Cl.
CPC ... *H04N 5/232121* (2018.08); *G06K 9/00228* (2013.01); *H04N 5/23219* (2013.01); *H04N 5/23245* (2013.01); *H04N 5/232122* (2018.08); *H04N 5/232127* (2018.08); *H04N 5/36961* (2018.08)

(58) Field of Classification Search
None
See application file for complete search history.

(56) References Cited

U.S. PATENT DOCUMENTS

| 8,018,524 B2 | 9/2011 | Kawarada | |
|---|---|---|---|
| 9,182,651 B2* | 11/2015 | Hitosuga | H04N 5/23212 |
| 2004/0202461 A1* | 10/2004 | Nakahara | H04N 5/232123 396/104 |
| 2006/0165403 A1* | 7/2006 | Ito | H04N 5/23212 396/123 |
| 2012/0092516 A1* | 4/2012 | Hata | G03B 15/00 348/222.1 |
| 2012/0274832 A1* | 11/2012 | Hitosuga | H04N 5/23212 348/333.11 |

(Continued)

FOREIGN PATENT DOCUMENTS

| CN | 101118369 A | 2/2008 |
|---|---|---|
| CN | 101359085 A | 2/2009 |

(Continued)

*Primary Examiner* — Cynthia Segura
(74) *Attorney, Agent, or Firm* — Canon U.S.A., Inc. IP Division

(57) ABSTRACT

A camera controller controls driving of a focus lens included in a lens group based on a result of first focus detection performed by a defocus amount detection unit. The defocus amount detection unit performs second focus detection based on image data acquired by a first image sensor which outputs image data corresponding to a subject image at a position of the focus lens that is based on the control. The camera controller evaluates, based on a result of the second focus detection, a focusing state of the image data that is based on an output of the first image sensor, and performs control to record information about the evaluated focusing state together with data corresponding to the image data.

10 Claims, 16 Drawing Sheets

(56) References Cited

U.S. PATENT DOCUMENTS

| | | | | |
|---|---|---|---|---|
| 2013/0009980 | A1* | 1/2013 | Gu | G06T 5/00 |
| | | | | 345/611 |
| 2014/0176780 | A1* | 6/2014 | Koshiba | G02B 7/34 |
| | | | | 348/336 |
| 2015/0116551 | A1* | 4/2015 | Kindaichi | H04N 5/23219 |
| | | | | 348/241 |
| 2016/0044230 | A1* | 2/2016 | Yoshimura | H04N 5/23212 |
| | | | | 348/353 |
| 2016/0088218 | A1* | 3/2016 | Kikuchi | G02B 7/34 |
| | | | | 348/231.6 |
| 2017/0187949 | A1* | 6/2017 | Kim | H04N 5/232122 |
| 2017/0347017 | A1* | 11/2017 | Ito | H04N 5/232122 |
| 2018/0059360 | A1* | 3/2018 | Omata | G03B 13/36 |
| 2018/0146131 | A1* | 5/2018 | Kikuchi | H04N 5/2252 |
| 2020/0045237 | A1* | 2/2020 | Miyazawa | H04N 5/232122 |

FOREIGN PATENT DOCUMENTS

| | | |
|---|---|---|
| CN | 101373255 A | 2/2009 |
| CN | 102761691 A | 10/2012 |
| CN | 105245772 A | 1/2016 |
| JP | H05-041966 B2 | 6/1993 |
| JP | 2004-219581 A | 8/2004 |
| JP | 2004-320487 A | 11/2004 |
| JP | 2008-275712 A | 11/2008 |
| JP | 2016-018116 A | 2/2016 |
| WO | 2008/029503 A1 | 3/2008 |

* cited by examiner

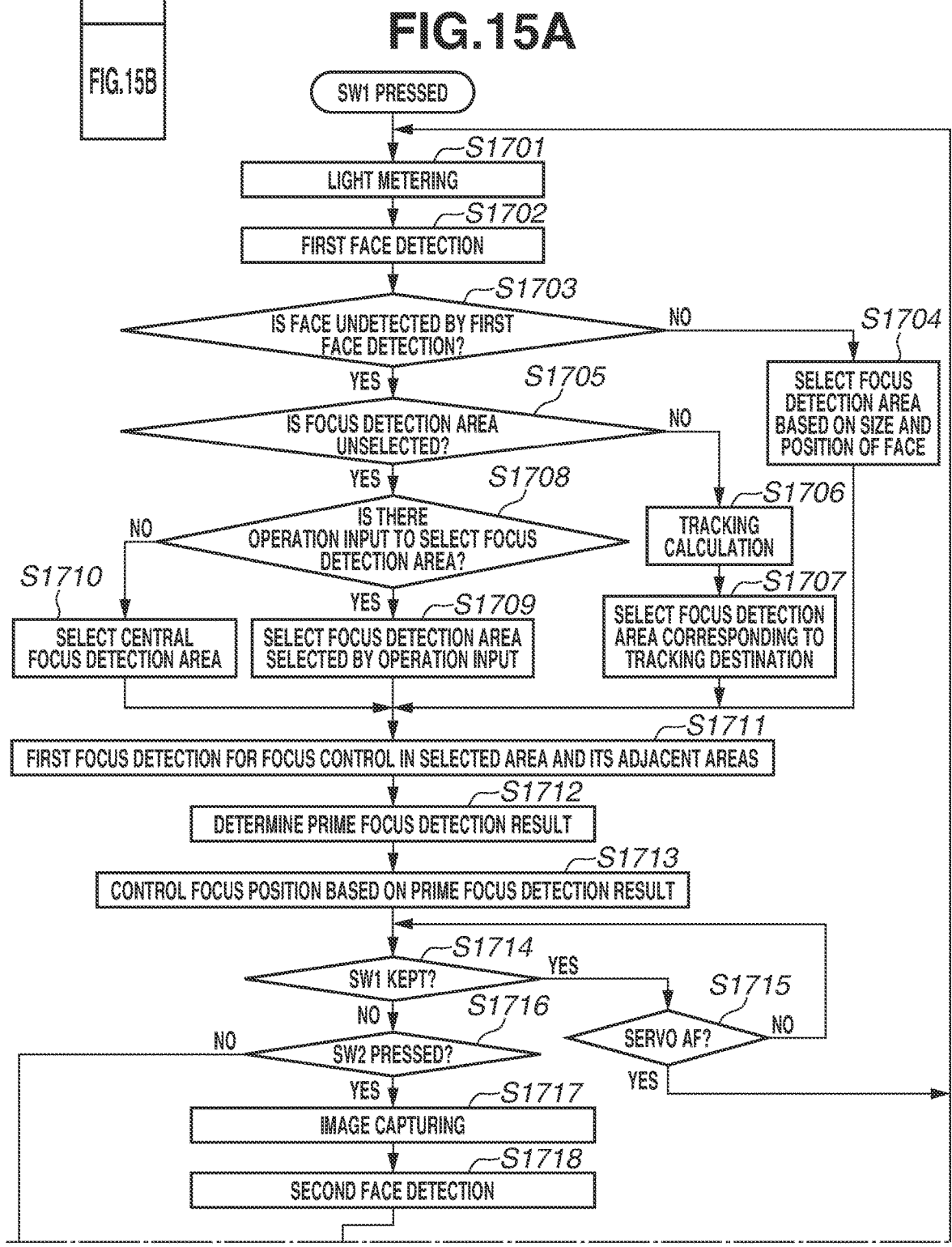

IMAGE PROCESSING APPARATUS, CONTROL METHOD THEREFOR, AND STORAGE MEDIUM FOR EVALUATING A FOCUSING STATE OF IMAGE DATA

BACKGROUND OF THE INVENTION

Field of the Invention

Aspects of the present invention generally relate to a technique to automatically classify image data obtained by an imaging apparatus, based on a focus detection result.

Description of the Related Art

Conventionally, as a method of classifying images captured by an imaging apparatus, there is known a method of classifying images according to degrees of sharpness of a plurality of images and recording the classified images. Japanese Patent Application Laid-Open No. 2004-320487 discusses operations of performing continuous shooting with a focus position fixed, acquiring auto-focus (AF) evaluation values from respective images obtained by continuous shooting, automatically selecting one image having the highest AF evaluation value, recording the selected image on a save recording region, and recording the unselected images on a deletion recording region.

Moreover, Japanese Patent Publication No. 5-41966 discusses an imaging apparatus which, to cause the focus position of an imaging apparatus to follow a moving subject, predicts the in-focus position of the subject to be obtained at the future time, based on times of focus detection or detection results obtained at a plurality of past times, while repeatedly performing focus detection.

In the operations discussed in Japanese Patent Application Laid-Open No. 2004-320487, since an image that is relatively in focus is recorded from among a plurality of images obtained by continuous shooting, the user's trouble of selecting an image having a good focusing state from among the plurality of images can be saved. However, in the technique discussed in Japanese Patent Application Laid-Open No. 2004-320487, there may be a case where an appropriate in-focus image cannot be selected. In the imaging apparatus discussed in Japanese Patent Publication No. 5-41966, since continuous shooting is performed with a focus position fixed, it can be estimated that a captured image having the highest AF evaluation value that is based on high-frequency components of the image is an image having the best focusing state. However, having the highest AF evaluation value merely means having a relatively most focusing state from among the captured images, and does not necessarily mean an intended subject being focused.

As mentioned above, in the technique discussed in Japanese Patent Application Laid-Open No. 2004-320487, there may be a case where an image that is not in focus on an intended subject is selected as the most in-focus image. In a case where an in-focus image cannot be selected, the issue to reduce the load of selection operation for the captured images cannot be resolved.

Moreover, for example, in the case of performing continuous shooting on a subject that is moving in depth, while moving the focus position, since shooting distances of the subject differ according to the focus position, the image magnification of the subject varies according to a change in shooting distance. Since, when the image magnification of the subject varies, the spatial frequency characteristic of the subject varies and the image capturing composition itself also varies, the level of an AF evaluation value that is based on high-frequency components of the image may fluctuate, so that focusing states become unable to be simply compared based on AF evaluation values. Accordingly, even in the case of performing continuous shooting while moving the focus position, an image having a good focusing state cannot be simply selected based on the AF evaluation values.

SUMMARY OF THE INVENTION

Aspects of the present invention are generally directed to providing a technique to reduce the load of selection operation for captured image data.

According to embodiments of the present invention, an image processing apparatus includes a first focus detection unit configured to perform first focus detection on a subject, a drive control unit configured to control driving of a focus lens based on a result of the first focus detection, a second focus detection unit configured to perform second focus detection of phase difference type based on image data acquired by a first image sensor, which outputs image data corresponding to a subject image, at a position of the focus lens that is based on control by the drive control unit, an evaluation unit configured to evaluate, based on a result of the second focus detection, a focusing state of the image data that is based on an output of the first image sensor, and a control unit configured to perform control to record information about the evaluated focusing state together with data corresponding to the image data.

Further features of the present invention will become apparent from the following description of exemplary embodiments with reference to the attached drawings.

DESCRIPTION OF THE EMBODIMENTS

Various exemplary embodiments, features, and aspects of the invention will be described in detail below with reference to the drawings.

<Configuration of Digital Camera>

Figure 1:
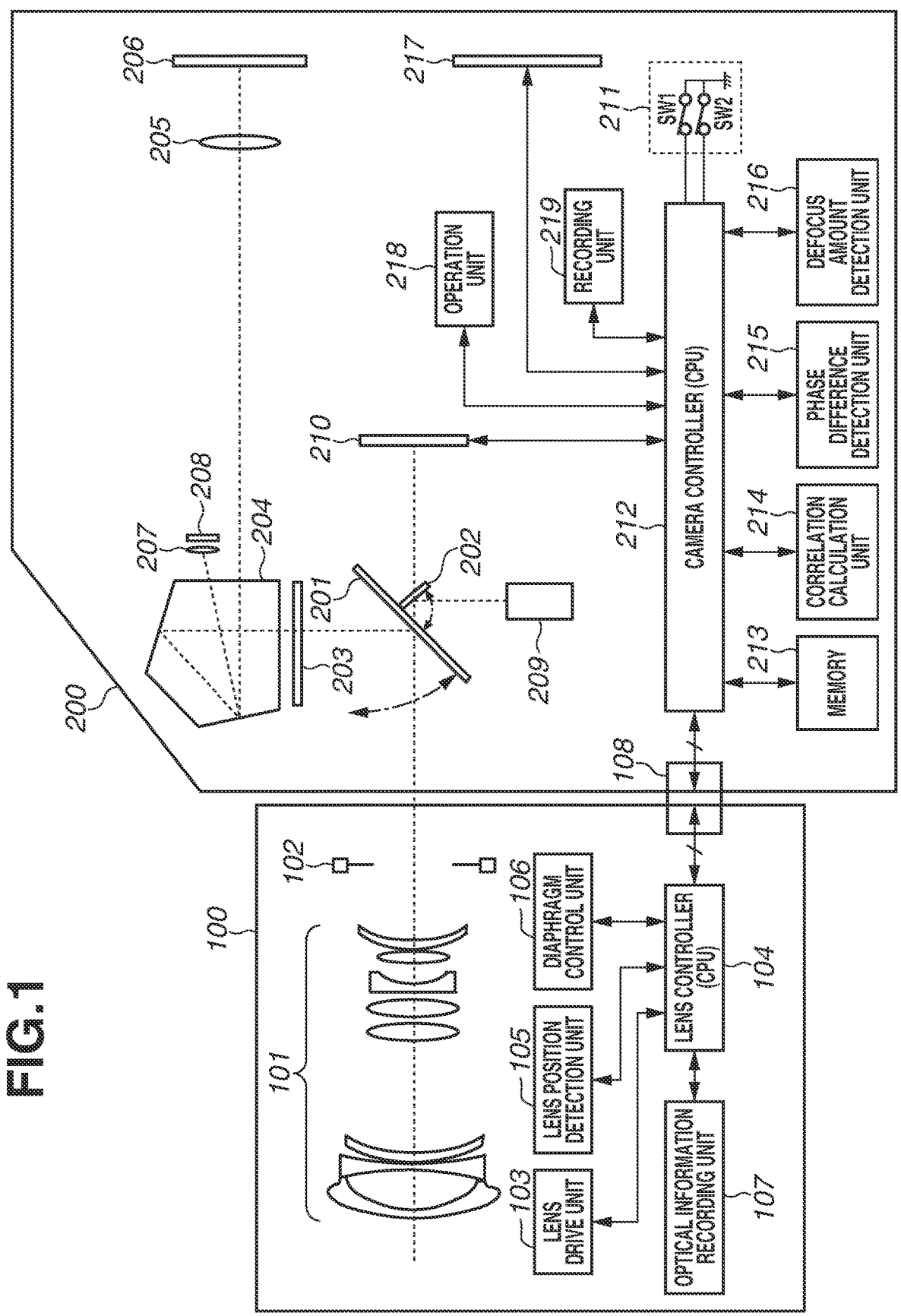
FIG. 1 is a diagram illustrating a configuration of a digital camera serving as an example of an imaging apparatus according to a first exemplary embodiment.

FIG. 1 is a diagram illustrating a configuration of a digital camera serving as an example of an imaging apparatus according to a first exemplary embodiment.

Referring to FIG. 1, the digital camera includes a lens section 100 and a camera section 200. The lens section 100 is detachably attached to the camera section 200 via a lens attachment mechanism of a mount section (not illustrated). An electric contact unit 108 is provided in the mount section. The electric contact unit 108 includes terminals for communication bus lines, including, for example, a communication clock line, a data transmission line, and a data reception line. These enable the lens section 100 and the camera section 200 to perform communication.

The lens section 100 includes a lens group 101, which constitutes an imaging optical system and includes a focus lens for performing focusing and a zoom lens for performing zooming, and a diaphragm 102, which controls incident light rays. Moreover, the lens section 100 further includes a drive system, which is configured with a stepping motor for performing zooming and focusing of the lens group 101, and a lens drive unit 103, which controls the drive system.

Moreover, the lens section 100 further includes a lens position detection unit 105, which detects position information about the lens by acquiring a phase waveform of the stepping motor included in the lens drive unit 103 from the lens drive unit 103 via a lens controller 104. The lens group 101, the lens drive unit 103, and the lens position detection unit 105 constitute a focus adjustment unit.

Moreover, the lens section 100 further includes a diaphragm control unit 106, which controls the aperture of the diaphragm 102, and an optical information recording unit 107, on which various optical design values of zooming, focusing, and aperture value of the lens group 101 are recorded.

The lens drive unit 103, the diaphragm control unit 106, and the optical information recording unit 107 are connected to the lens controller 104, which is configured with a central processing unit (CPU) that controls the overall operation of the lens section 100.

The camera section 200 performs communication with the lens section 100 via the electric contact unit 108, thus transmitting a control request for zooming and focusing of the lens group 101 and the aperture of the diaphragm 102 and receiving a control result.

Incident light rays are guided to a main mirror 201 via the lens group 101 and the diaphragm 102. The main mirror 201 is formed as a half mirror, and, in the illustrated state in which the main mirror 201 is located obliquely on the optical path, half of the incident light rays are guided to a focusing screen 203 and the remaining half thereof are guided to a sub-mirror 202. The state in which the main mirror 201 is located on the optical path of incident light rays coming from the lens section 100 as illustrated in FIG. 1 is hereinafter referred to as "mirror down". The main mirror 201 is mechanically configured to be movable upward as indicated by a curve with a double-headed arrow in FIG. 1, thus being able to be retracted from the optical path. The state in which the main mirror 201 is retracted from the optical path is hereinafter referred to as "mirror up". The sub-mirror 202 is also mechanically configured to be movable toward the main mirror 201 as indicated by a curve with a double-headed arrow in FIG. 1, so that, at the time of mirror up mentioned above, the sub-mirror 202 is moved toward the main mirror 201 in such a way as not to be located on the optical path.

The focusing screen 203 is a diffusing plate mounted at a position optically conjugate with an imaging section 210 described below (being an example of a first image sensor in the present exemplary embodiment), and allows an incident subject image to be formed thereon. Light rays having passed through the focusing screen 203 are converted into an erected image by being subjected to optical path changing by a pentagonal prism 204, and the erected image then arrives at a viewfinder 206 via an eyepiece lens 205. This enables the user to observe a subject image formed on the focusing screen 203 by looking into the viewfinder 206.

Moreover, part of the light rays subjected to optical path changing by the pentagonal prism 204 are made incident on a light metering sensor 208, which measures the luminance of a subject image, via a light metering image-forming lens 207, which once more converges light rays into an image, so as to measure the luminance of a subject image formed on the focusing screen 203. The light metering sensor 208 is configured with a photoelectric conversion element (not illustrated) and a processor (not illustrated), which calculates the luminance from the obtained electric charges. Moreover, the light metering sensor 208 obtains a two-dimensional black-and-white multi-gradation image from electric charges obtained from the photoelectric conversion element, and the obtained image is then transmitted to a memory 213 so as to be able to be referred to later by various modules.

Moreover, at the time of mirror down, the sub-mirror 202 guides incident light rays to a focus detection unit 209. The focus detection unit 209 performs focus detection of a known phase-difference detection method according to a focus detection area. In the present exemplary embodiment, as the focus detection area, for example, one place in a specific two-dimensional plane area, such as a central portion of the angle of view of a captured image, can be considered. The physical placement of the focus detection unit 209 is determined based on the optical axis center of incident light rays and the orientation of an erected image in consideration of the focus detection area.

On the other hand, at the time of mirror up, incident light rays are guided to the imaging section 210, which is included in the camera section 200, via the lens group 101 and the diaphragm 102. The imaging section 210 is what is called an image sensor, and also includes a processor which performs various image processing operations, such as electronic developing calculation and luminance correction. Details of the imaging section 210 are described below.

Moreover, the camera section 200 is provided with an operation switch 211, which is used to perform operation inputting to the camera section 200. The operation switch 211 is configured with two-stage stroke type switches. The switch at the first stage (SW1) is a switch for starting an image capturing preparation operation. In response to pressing of the switch SW1, the main mirror 201 and the sub-mirror 202 are controlled to be set to the mirror down state, which is an initial state, and, for example, first light metering using the light metering sensor 208 and first focus detection using the focus detection unit 209 are performed. The switch at the second stage (SW2) is a switch for starting an image capturing operation, such as electric charge accumulation and electric charge readout by the imaging section 210, to acquire a still image. In a case where the switch SW2 is pressed, the switch SW1 is also in a state of being pressed. Moreover, depending on selection of an image capturing operation mode of the digital camera described below, the digital camera is provided with an operation mode in which the operations performed in response to pressing of the switches SW1 and SW2 are repeatedly performed so that, in a case where the switch SW2 is continuously kept pressed, image capturing (continuous shooting) is continuously performed until the pressing state of the operation switch 211 is released.

A correlation calculation unit 214 calculates a correlation amount for every image shift amount by a correlation calculation based on signals acquired from the focus detection unit 209 or the imaging section 210. The calculated correlation amount is used for a phase difference detection unit 215 to calculate a phase difference according to which the correlation amount becomes largest. A defocus amount detection unit 216 calculates a defocus amount by a known phase difference detection method based on the phase difference calculated by the phase difference detection unit 215 and an optical characteristic of the lens section 100.

A camera controller 212 transmits and receives control information to and from the lens controller 104 via the electric contact unit 108, and drives and controls the lens group 101 based on the defocus amount calculated by the defocus amount detection unit 216, thus adjusting the focus position.

The digital camera in the present exemplary embodiment includes a display unit 217, which displays a subject image captured by the imaging section 210 and various operation statuses. Moreover, the digital camera has a still image one-shot mode, a still image continuous shooting mode, a live view mode, and a moving image recording mode, which are image capturing operation modes described below, and includes an operation unit 218, which is used to switch the operation of the imaging section 210 to any one of the image capturing operation modes. Besides, the operation unit 218 allows operation inputting for starting and ending moving image recording. Moreover, the digital camera in the present exemplary embodiment further has various focus detection modes such as a one-shot AF mode and a servo AF mode described below, and the operation unit 218 allows operation inputting for selecting each focus detection mode.
<Imaging Section 210>

Next, the appearance of a pixel surface in the imaging section 210 as viewed from the incident light side is described with reference to FIG. 2 and FIGS. 3A and 3B.

Figure 2:
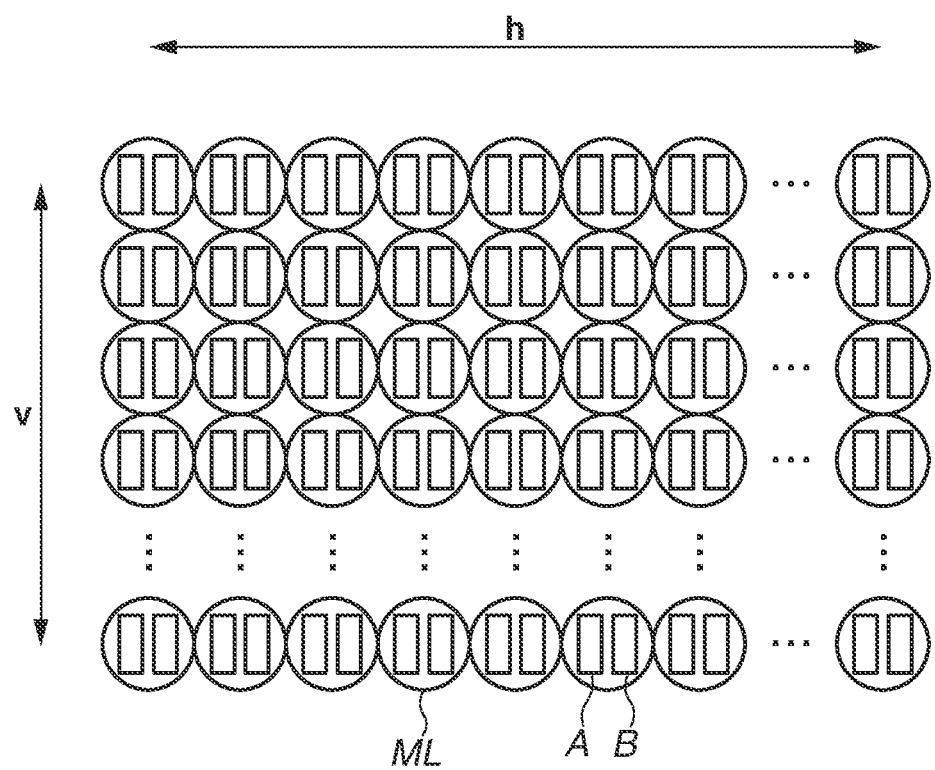
FIG. 2 is a schematic view illustrating the appearance of a pixel surface of an imaging section as viewed from an incident light side.

The imaging section 210 includes, as illustrated in FIG. 2, a plurality of pixel portions, in which h pixel portions are arranged in the horizontal direction and v pixel portions are arranged in the vertical direction (h and v being natural numbers). Each pixel portion includes a first focus detection pixel A and a second focus detection pixel B, on which a pair of light rays obtained by dividing a subject image at an exit pupil plane respectively falls. A microlens ML is located for light collection in front of the first focus detection pixel A and the second focus detection pixel B. Each pixel portion includes a color filter of any one of colors, red, green, and blue (not illustrated). The color filters are arrayed in a known Bayer arrangement.

Each pixel portion includes the first focus detection pixel A and the second focus detection pixel B as a photoelectric conversion element. Adding together electric charges obtained from the first focus detection pixel A and the second focus detection pixel B enables obtaining electric charges as an image capturing pixel illustrated, for example, in FIG. 3B.

Next, a structure of each pixel portion is described with reference to FIGS. 3A and 3B.

Figure 3A:
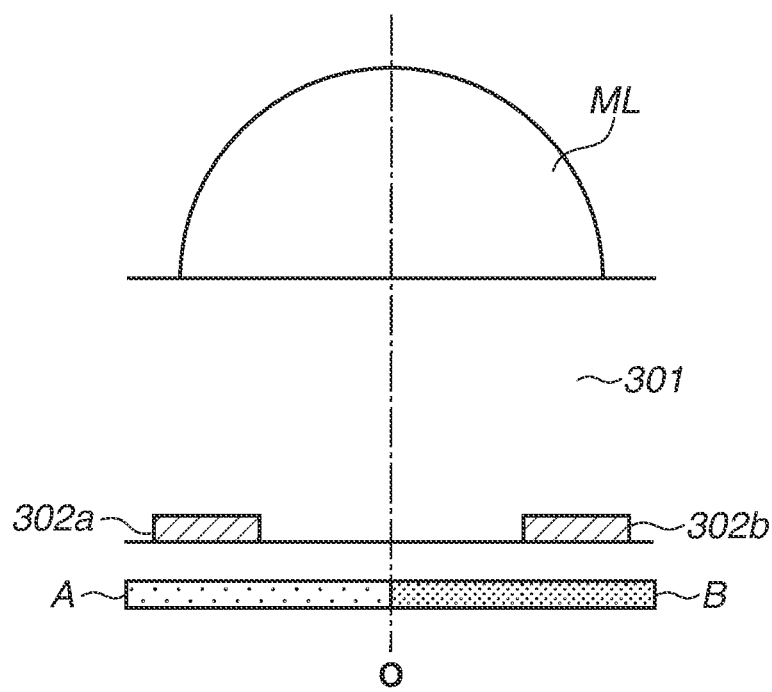
FIGS. 3A and 3B are diagrams each illustrating a structure of a pixel portion included in the imaging section.
Figure 3B:
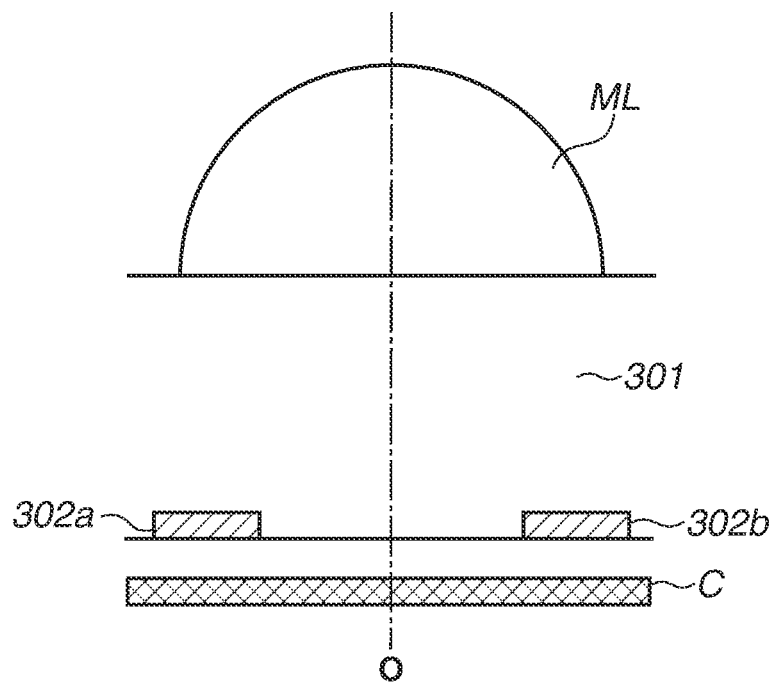

Referring to FIGS. 3A and 3B, a microlens ML is formed at the light incidence side of the first focus detection pixel A and the second focus detection pixel B. A flattening layer 301 is a flat surface on which the microlens ML is formed. Light shielding layers 302a and 302b are arranged to prevent unnecessary obliquely-incident light rays from falling on the first focus detection pixel A and the second focus detection pixel B.

According to the configuration illustrated in FIGS. 3A and 3B, the case where the imaging optical system is viewed from the first focus detection pixel A and the case where the imaging optical system is viewed from the second focus detection pixel B become equivalent to the pupil of the imaging optical system being symmetrically divided. Since the position of the pupil of the imaging optical system differs between the case where the imaging optical system is viewed from the first focus detection pixel A and the case where the imaging optical system is viewed from the second focus detection pixel B, a light flux which is received by the first focus detection pixel A and a light flux which is received by the second focus detection pixel B have a parallax.
<Principle of Focus Detection of Imaging Plane Phase Difference Method>

As the number of pixels of the image sensor increases, two approximate images would become formed at a first focus detection pixel row (a row of a plurality of first focus detection pixels A) and a second focus detection pixel row (a row of a plurality of second focus detection pixels B), which form a pair. In the state in which the imaging optical system is focused on a subject, a row of image signals formed by the first focus detection pixel row (also referred to as "A-image signals") and a row of image signals formed by the second focus detection pixel row (also referred to as "B-image signals") coincide with each other.

On the other hand, if the imaging optical system is out of focus, a phase difference occurs between a row of image signals formed by the first focus detection pixel row and a row of image signals formed by the second focus detection pixel row. The difference of the phase difference becomes opposite between a front focus state, in which the image forming position is in front of a predetermined focal plane, and a back focus state, in which the image forming position is behind a predetermined focal plane.

Figure 4:
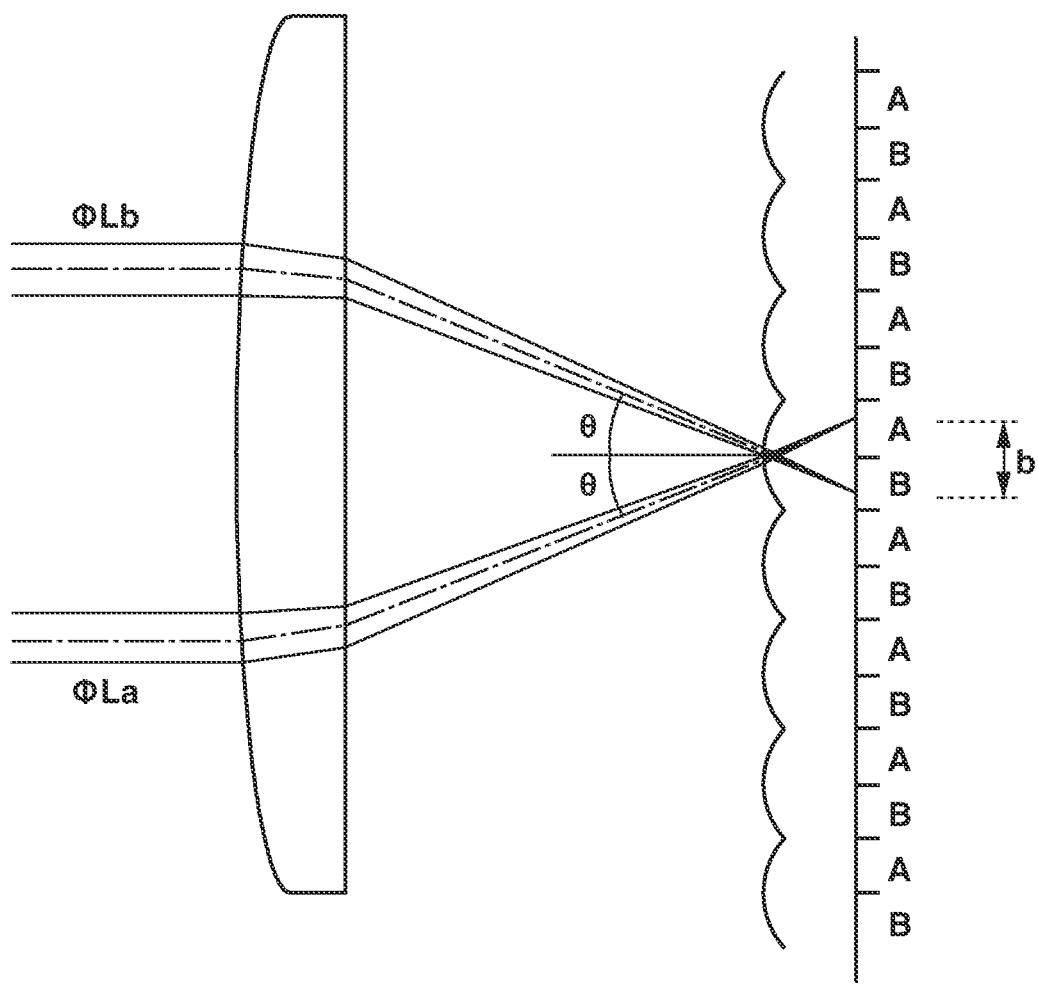
FIG. 4 is a diagram illustrating a phase difference between image signals of a first focus detection pixel A and a second focus detection pixel B obtained when an in-focus state is attained.
Figure 5:
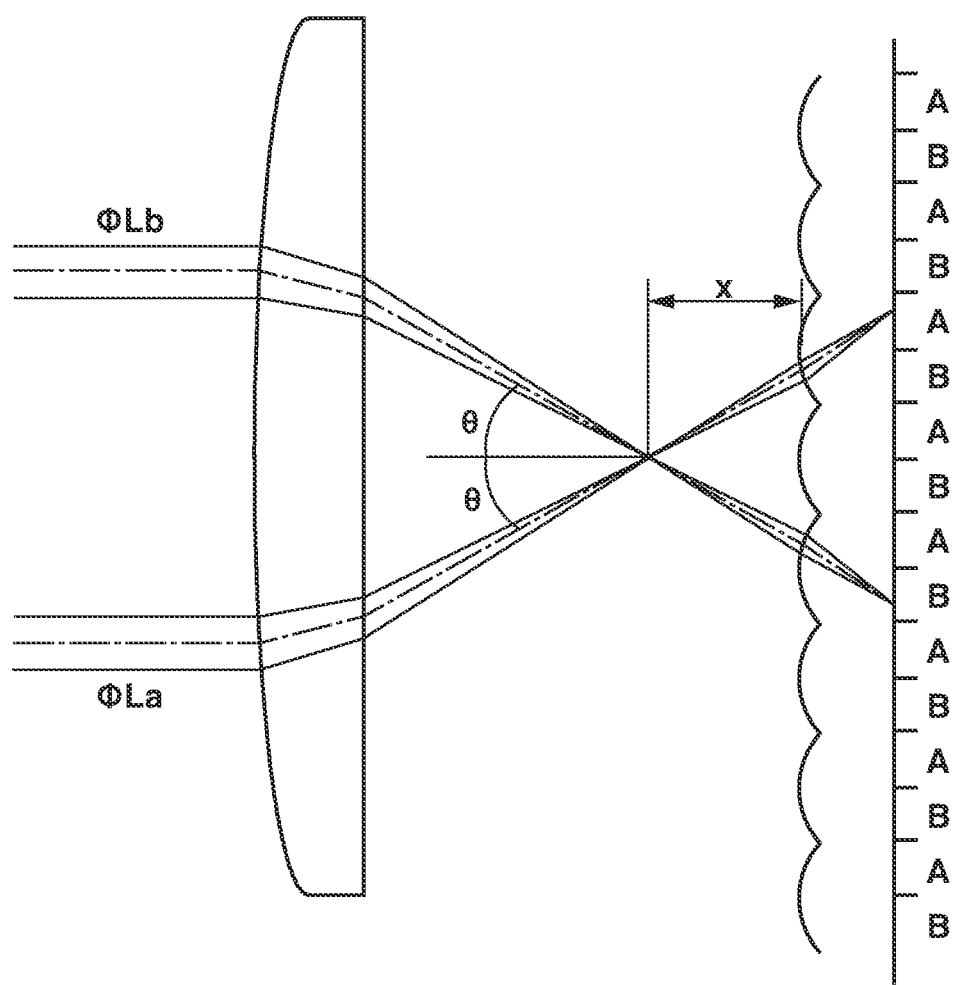
FIG. 5 is a diagram illustrating a phase difference between image signals of the first focus detection pixel A and the second focus detection pixel B obtained before an in-focus state is attained.

FIG. 4 is a diagram illustrating a phase difference between image signals of the first focus detection pixel A and the second focus detection pixel B obtained when an in-focus state is attained at a pixel portion. FIG. 5 is a diagram illustrating a phase difference between image signals of the first focus detection pixel A and the second focus detection pixel B obtained before an in-focus state is attained at a pixel portion. In FIG. 4 and FIG. 5, the focus detection pixel A is denoted by A and the focus detection pixel B is denoted by B in a conceptual manner.

A light flux coming from a specific point on a subject is split into a light flux ΦLa, which falls on the focus detection pixel A via a split pupil corresponding to the focus detection pixel A, and a light flux ΦLb, which falls on the focus detection pixel B via a split pupil corresponding to the focus detection pixel B. These two light fluxes come from the same point on the subject, and, therefore, in the state in which the imaging optical system is in focus, pass through the same microlens and arrive at one point on the image sensor, as illustrated in FIG. 4. Accordingly, the A-image signal and the B-image signal, which are a pair of image signals, coincide with each other.

However, as illustrated in FIG. 5, in the state in which the imaging optical system is out of focus by "x", the positions of arrival of the light fluxes ΦLa and ΦLb shift from each other by a change in incidence angle of the light fluxes ΦLa and ΦLb to microlenses. Accordingly, a phase difference occurs between the A-image signal and the B-image signal, which are a pair of image signals.

Calculating a phase difference between the A-image signal and the B-image signal, which are a pair of image signals, enables performing focus detection of the phase difference method.

A correlation amount for each image shift amount is calculated based on the A-image signal and the B-image signal, which are a pair of image signals, and a phase difference is calculated based on the calculated correlation amount, so that focus detection of the phase difference method can be performed.

<Focus Detection Unit 209>

Next, the appearance of an optical system of the focus detection unit 209 is described with reference to FIG. 6.

Figure 6:
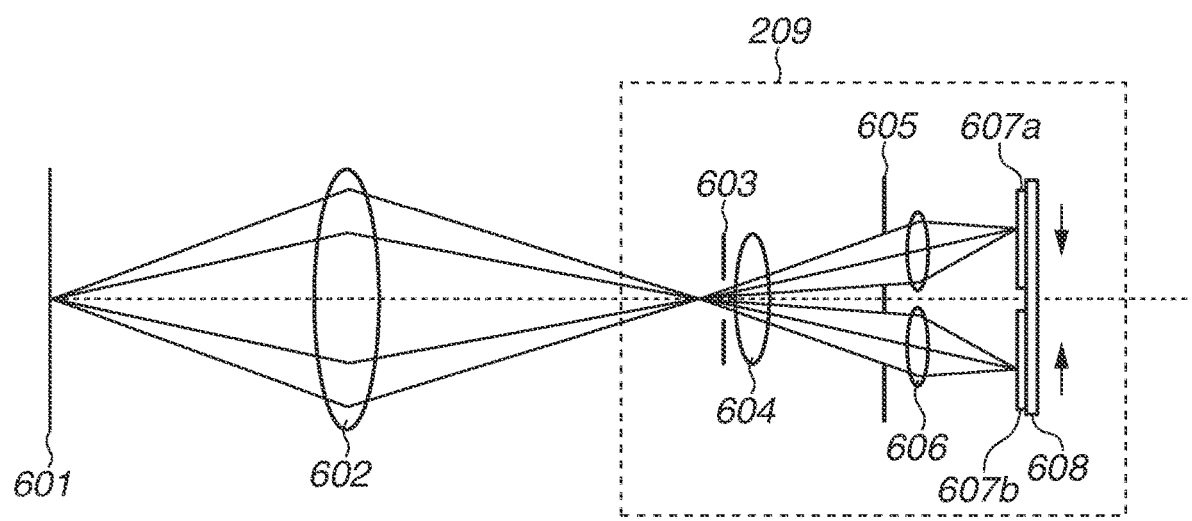
FIG. 6 is a schematic view illustrating the appearance of an optical system of a focus detection unit illustrated in FIG. 1.

Referring to FIG. 6, light rays of a subject image coming from a subject surface 601 pass through an imaging optical system 602, which includes the lens group 101 and the diaphragm 102, and the main mirror 201 and are then reflected by the sub-mirror 202 and made incident on the focus detection unit 209.

The focus detection unit 209 is configured with a visual field mask 603, a field lens 604, secondary optical system diaphragms 605, secondary image-forming lenses 606, and a focus detection sensor 608 including at least a pair of photoelectric conversion element row 607a and photoelectric conversion element row 607b.

Light rays entering the focus detection unit 209 reach the visual field mask 603, which is located near a predetermined image forming plane, and the field lens 604, which is located next to the visual field mask 603. The visual field mask 603 is a light shielding member for preventing unnecessary light fluxes outside a focus detection visual field from falling on the field lens 604 to the photoelectric conversion element rows 607a and 607b. The field lens 604 is a lens for controlling the light rays coming from the imaging optical system 602 so as to reduce attenuation of light or unsharpness at the periphery of the focus detection visual field. Light rays having passed through the field lens 604 further pass through a pair of secondary optical system diaphragms 605 and a pair of secondary image-forming lenses 606 arranged symmetrically with respect to the optical axis of the imaging optical system 602. With this, one of a pair of different light fluxes included in the light fluxes passing through the imaging optical system 602 forms an image on the photoelectric conversion element row 607a and the other thereof forms an image on the photoelectric conversion element row 607b.

<Principle of Focus Detection Based on Signals of Focus Detection Unit 209>

In a case where the image forming plane of the imaging optical system 602 is in front of the predetermined image forming plane, a state in which light rays falling on the photoelectric conversion element row 607a and light rays falling on the photoelectric conversion element row 607b have come close to each other in directions indicated by arrows in FIG. 6 occurs. Moreover, in a case where the image forming plane of the imaging optical system 602 is behind the predetermined image forming plane, a state in which light rays falling on the photoelectric conversion element row 607a and light rays falling on the photoelectric conversion element row 607b have moved away from each other occurs. Thus, the amount of deviation between light rays falling on the photoelectric conversion element row 607a and light rays falling on the photoelectric conversion element row 607b has a correlation with the degree of focusing of the imaging optical system 602. Obtaining a phase difference between an image signal obtained by photoelectrically converting light rays falling on the photoelectric conversion element row 607a and an image signal obtained by photoelectrically converting light rays falling on the photoelectric conversion element row 607b enables performing focus detection of the phase difference method.

<Operation Modes of Digital Camera>

The digital camera in the present exemplary embodiment has a still image one-shot mode and a still image continuous shooting mode, which differ in operations leading from image capturing to recording. Each mode is described as follows.

<Still Image One-Shot Mode>

The still image one-shot mode in the present exemplary embodiment is a mode in which one still image is obtained in response to the operation switch 211 being pressed to the switch SW2. In the still image one-shot mode, the main mirror 201 is controlled by the camera controller 212 in such a way as to be located on the optical path of incident light rays, in other words, to be in a mirror down state, and the user is allowed to view a subject image by looking into the viewfinder 206. Moreover, light rays are guided to the focus detection unit 209 by the sub-mirror 202.

In the still image one-shot mode, when the switch SW1 of the operation switch 211 is pressed, a first light metering operation, which measures the luminance of a subject with use of the light metering sensor 208, is performed, and the aperture of the diaphragm 102 and the electric charge accumulation time and ISO sensitivity of the imaging section 210 are determined based on a result of the first light metering operation. Moreover, in the still image one-shot mode, when the switch SW1 is pressed, following the first light metering operation, first focus detection is performed by the focus detection unit 209, and the focus position of the lens group 101 is controlled based on the obtained first focus detection result.

In the still image one-shot mode, when the operation switch 211 is pressed deep from the pressed state of the switch SW1 to the switch SW2, the diaphragm 102 is controlled to have the aperture determined based on the result of the first light metering operation. Moreover, at the same time, the main mirror 201 and the sub-mirror 202 are controlled in such a way as to be retracted from the optical path, in other words, to become in a mirror up state. After completion of mirror up control, an image capturing operation, in which the imaging section 210 acquires an image signal with use of the electric charge accumulation time and the ISO sensitivity determined based on the light metering result, is performed. The imaging section 210 generates first RAW data, which is image data obtained by pupil division, from a captured image signal obtained by photoelectrically converting an incident subject image. Here, the first RAW data is image data obtained by pupil division, which is obtained by photoelectrically converting each of a pair of subject image light fluxes obtained by pupil division at the exit pupil plane. In other words, the first RAW data is data retaining a signal corresponding to the focus detection pixel A of each pixel portion and a signal corresponding to the focus detection pixel B thereof. The first RAW data is then temporarily stored in the memory 213, which is connected to the camera controller 212.

The first RAW data temporarily stored in the memory 213 is transmitted to the correlation calculation unit 214, which is connected to the camera controller 212, and is then used for second focus detection, which is focus detection that is based on image data obtained by pupil division.

Moreover, the camera controller 212 converts the first RAW data into a predetermined file format which is used for a RAW file for recording, thus generating second RAW data for recording. The second RAW data is data in which an image capturing condition (for example, an aperture value) used at the time of an image capturing operation and attribute information are recorded together with data equivalent to the first RAW data. The second RAW data is then recorded on a recording unit 219.

Furthermore, the camera controller 212 adds together a pair of pixel signals obtained by pupil division included in the second RAW data, and performs image processing, such as known developing calculation, on a signal obtained by such addition. With this processing performed, still image data for recording converted into a known file format (in the present exemplary embodiment, for example, a Joint Photographic Experts Group (JPEG) file) is obtained and is then recorded on the recording unit 219.

<Still Image Continuous Shooting Mode>

The still image continuous shooting mode in the present exemplary embodiment is a mode in which, in response to an operation input state in which the operation switch 211 has been pressed to the switch SW2 being continued, acquisition of a still image is repeated until the operation switch 211 is released from being pressed. With this, a plurality of still images obtained by continuous shooting is acquired.

<AF Mode>

Moreover, the digital camera has a one-shot AF mode and a servo AF mode, which differ in focus detection operation. Each mode is described as follows.

The one-shot AF mode is a focus detection mode in which, in response to the switch SW1 of the operation switch 211 being pressed, focus position control to attain an in-focus state is performed only once. After completion of the focus position control, the focus position is fixed without any change while a state in which the switch SW1 has been pressed continues. In the present exemplary embodiment, during the still image one-shot mode, the camera controller 212 performs control in such a manner that the focus detection operation in the one-shot AF mode is performed.

On the other hand, the servo AF mode is a focus detection mode in which, while the switch SW1 of the operation switch 211 is being pressed, focus detection is repeatedly performed and focus position control to attain an in-focus state continues being performed. Continuing operations leading from focus detection to focus position control enables causing the focus position to follow a moving subject. In response to the pressing of the switch SW1 being released or the operation switch 211 being pressed deep to the switch SW2, the above-mentioned repetitive operations end. In the present exemplary embodiment, during the still image continuous shooting mode, the camera controller 212 performs control in such a manner that the focus detection operation in the servo AF mode is performed.

<Operation of Digital Camera>

Figure 7:
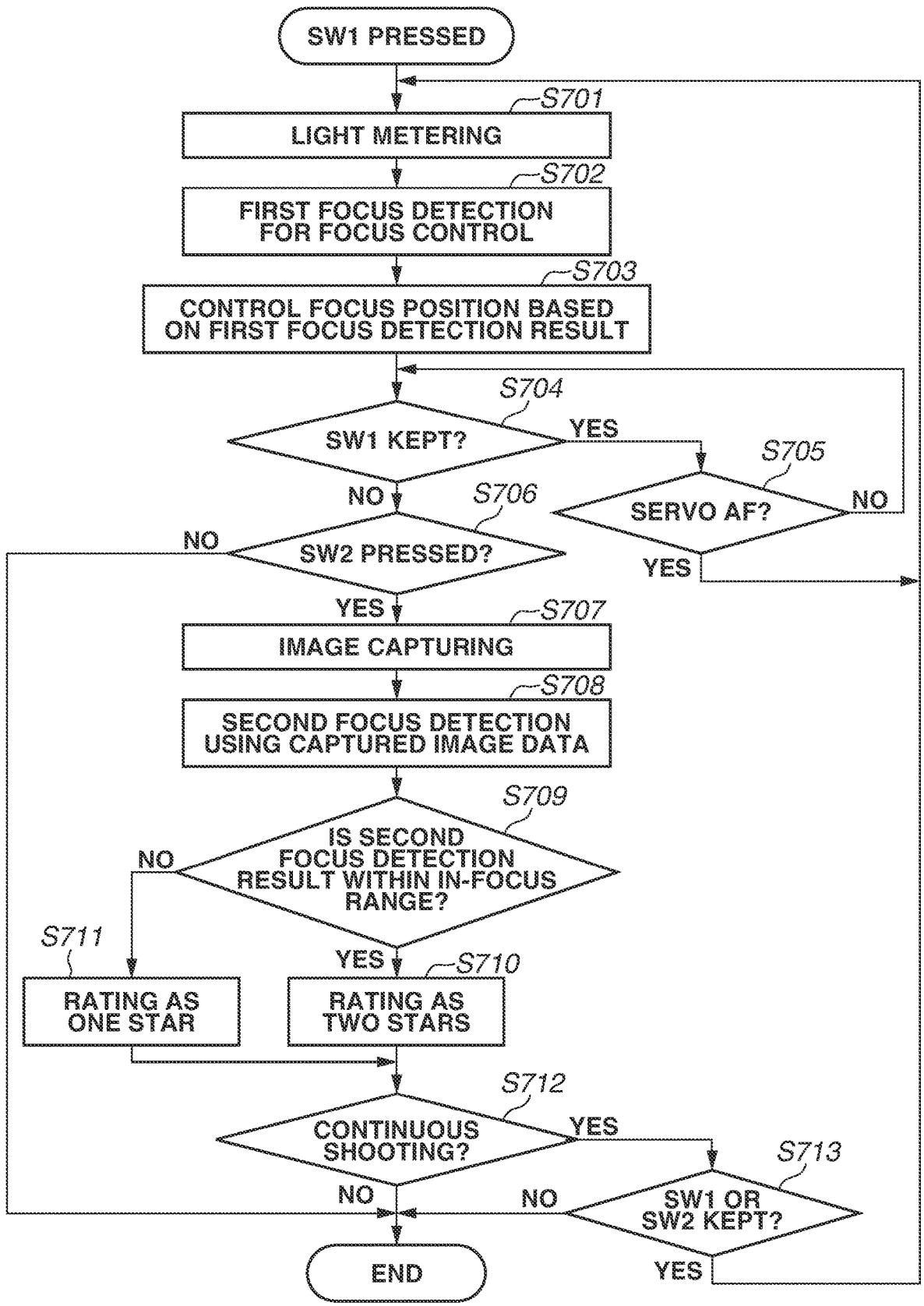
FIG. 7 is a flowchart illustrating the flow of an image capturing operation of the digital camera and a rating operation for images according to the first exemplary embodiment.

FIG. 7 is a flowchart illustrating the flow of an image capturing operation of the digital camera and a rating operation for images according to the present exemplary embodiment. These operations can be implemented by the camera controller 212 controlling each unit or section.

<Image Capturing Operation (Step S701 to Step S707)>

In an initial state immediately after being powered on, the digital camera in the present exemplary embodiment is in a state in which the still image one-shot mode or the still image continuous shooting mode is set in the mirror down state and the user is allowed to check a subject image by looking into the viewfinder 206. First, in response to the switch SW1 of the operation switch 211 being pressed by the user, the operation in the present exemplary embodiment is started, so that the processing proceeds to step S701.

In step S701, the light metering sensor 208 performs light metering to obtain a light metering result. After completion of the light metering, the processing proceeds to step S702.

In step S702, the focus detection unit 209 performs first focus detection for detecting the defocus amount of the lens group 101, thus obtaining the defocus amount as a first focus detection result. After completion of the first focus detection, the processing proceeds to step S703.

In step S703, the camera controller 212 calculates the lens driving amount, which is the driving amount of the lens group 101, based on the first focus detection result obtained in step S702. The camera controller 212 transmits the calculated lens driving amount to the lens controller 104. The lens controller 104 controls the focus position of the lens group 101 via the lens drive unit 103 based on the received lens driving amount. After completion of control of the focus position, the processing proceeds to step S704.

In calculating the lens driving amount in step S703, the current aperture value acquired from the diaphragm control unit 106 via the lens controller 104 can be taken into consideration. Moreover, a reference lens driving amount required for focus position changes for a unit defocus amount, which is determined for each focus position, or a variation magnification of the reference lens driving amount, which optically varies as the defocus amount increases, can be acquired from the optical information recording unit 107 and taken into consideration.

In step S704, the camera controller 212 detects the operation input state of the operation switch 211 and determines whether the switch SW1 is being kept. If it is determined that the switch SW1 is being kept (YES in step S704), the processing proceeds to step S705. If it is determined that the switch SW1 is not being kept (NO in step S704), the processing proceeds to step S706.

In step S705, the camera controller 212 determines whether the focus detection mode is the servo AF mode. If it is determined that the focus detection mode is the servo AF mode (YES in step S705), the processing returns to step S701 to repeatedly perform light metering, focus detection, and control of the focus position until the switch SW2 of the operation switch 211 is pressed by the user. If it is determined that the focus detection mode is the one-shot AF mode (NO in step S705), the processing returns to step S704 to continue monitoring the kept state of the switch SW1 of the operation switch 211 while fixing the focus position.

In step S706, the camera controller 212 detects the operation input state of the operation switch 211 and determines whether the operation switch 211 has been pressed to the switch SW2. If it is determined that the operation switch 211 has been pressed to the switch SW2 (YES in step S706), the processing proceeds to step S707. If it is determined that the operation switch 211 has not been pressed to the switch SW2 (NO in step S706), the camera controller 212 assumes that the switches SW1 and SW2 of the operation switch 211 are in a state of being released from pressing and thus ends the operation in the present exemplary embodiment.

In step S707, the camera controller 212 performs control to bring the main mirror 201 and the sub-mirror 202 into a mirror up state so as to cause light rays of a subject image to fall on the imaging section 210. The imaging section 210 performs an image capturing operation for acquiring an image signal based on the electric charge accumulation time and the ISO sensitivity determined from the light metering result obtained in step S701.

The imaging section 210 acquires an image signal by photoelectrically converting an incident subject image, thus generating first RAW data, which is image data obtained by pupil division. The generated first RAW data is transferred to the memory 213. Moreover, besides this, the camera controller 212 generates second RAW data or generates still image data of a known file format (for example, a JPEG file) by performing predetermined image processing on the second RAW data. The camera controller 212 can perform control to record the second RAW data and the still image data of a known file format on the recording unit 219. After completion of recording, the processing proceeds to step S708.

<Rating of Image (Step S708 to Step S711)>

In step S708, the camera controller 212 performs second focus detection with use of the first RAW data transferred to the memory 213. The defocus amount detection unit 216 acquires a defocus amount based on a result of the second focus detection. The second focus detection in the present exemplary embodiment is performed after the image capturing operation performed in step S707, and is, therefore, performed after the control of the focus position performed in step S703, which is based on a result of the first focus detection performed in step S702, in one sequence of the present flow.

The second focus detection is more specifically described. First, the first RAW data is transferred by the camera controller 212 from the memory 213 to the correlation calculation unit 214. In the transferred first RAW data, an image region corresponding to the focus detection area is extracted by the correlation calculation unit 214, and a correlation amount for each shift amount in phase between focus detection pixel rows of the extracted image region is calculated. After the correlation amount for each shift amount is calculated, the phase difference detection unit 215 calculates a phase difference according to which the correlation amount becomes largest. The defocus amount detection unit 216 acquires, from the optical information recording unit 107, the reference defocus amount for a unit phase difference determined for each aperture value of the diaphragm 102. After acquisition, the defocus amount detection unit 216 calculates a defocus amount according to a known phase difference detection method based on the acquired reference defocus amount for the unit phase difference and the phase difference calculated by the phase difference detection unit 215. After completion of calculation of the defocus amount, the processing proceeds to step S709.

In step S709, the camera controller 212 determines whether the defocus amount calculated based on a result of the second focus detection is within a predetermined in-focus range. In other words, the camera controller 212 determines whether the second RAW data and the still image data obtained in step S707 correspond to an image in which the focus position is adjusted to an intended subject.

The predetermined in-focus range is, for example, a range of focus positions which are determined by defocus amounts of −1 Fδ to +1 Fδ [μm] when the aperture value is denoted by F and the permissible circle of confusion diameter is denoted by δ [μm]. If it is determined that the defocus amount obtained in step S708 is within the predetermined in-focus range (YES in step S709), the camera controller 212 assumes that the second RAW data and the still image data obtained in step S707 correspond to an image in which the focus position is adjusted to an intended subject, and the processing proceeds to step S710. If it is determined that the obtained defocus amount is not within the predetermined in-focus range (NO in step S709), the camera controller 212 assumes that the second RAW data and the still image data obtained in step S707 correspond to a blurred image in which the focus position is not adjusted to an intended subject, and the processing proceeds to step S711. Furthermore, the camera controller 212 can determine an in-focus state when the absolute value of the defocus amount is less than a predetermined threshold value and can determine an out-of-focus state when the absolute value of the defocus amount is equal to or greater than the predetermined threshold value. Moreover, the camera controller 212 only needs to be able to determine a focusing state based on information corresponding to the focusing state. For example, the camera controller 212 can determine a focusing state by determining whether the above-mentioned image deviation amount is within a predetermined range.

In step S710, the camera controller 212 performs rating that is based on the absolute value of the defocus amount with respect to the second RAW data and the still image data recorded on the recording unit 219 in step S707. Then, the camera controller 212 records a rating obtained as a result of rating in attribute regions of the second RAW data and the still image data.

In an image file in the present exemplary embodiment, the region in which the rating obtained as a result of rating is recorded is not an image data region composed of binary data but an attribute region which is allowed to be edited later by the user. With such an operation performed, in a case where the user has come to want to manually perform rating later or the user has come to correct the rating recorded by the imaging apparatus in the present exemplary embodiment, the user is allowed to perform editing with ease, so that operation efficiency can be enhanced. As examples of methods for recording the rating result in the attribute region, for example, in a case where still image data is stored in the JPEG format, there is a method of writing in the "APP1", which is a marker segment in the JPEG format indicating attribute information, based on the following reference literature 1. Besides, there is also a method of writing in the "MakerNote", which is a tag for manufacturers to uniquely use in the Exif standard, based on the following reference literature 2. In any of the two writing methods, writing the rating according to the recording specifications described in the following reference literature 3 configured with Extensible Markup Language (XML) text data enables image editing software manufactured by a third party to read out a result of rating with some extent of compatibility. Furthermore, in the JPEG file format or the Exif format, a region is divided into a plurality of segments with a two-byte marker used as a mark, so that the content of attribute information to be recorded can be discriminated according to the value of a marker to be used. Such a recording manner in which data columns of various pieces of information are separated by marker segments is used in not only the JPEG format but also the Tag Image File Format (TIFF) and other image file formats.

(Reference literature 1) ISO/IEC 10918-1:1994

(Reference literature 2) Camera & Imaging Products Association, Image File Format Standards for Digital Cameras, Exif 2.31 (CIPA DC-008-2016)

(Reference literature 3) "Extensible Metadata Platform (XMP) Specification", Part 1-Part 3, Adobe Systems Incorporated.

In the present exemplary embodiment, as an example of rating, a case where an in-focus state is set as two stars and an out-of-focus state is set as one star is described. Furthermore, in the present exemplary embodiment, to make a distinction from image data that is not yet rated, the camera controller 212 does not bother to handle an out-of-focus state as no stars. In step S710, since the obtained defocus amount is within the predetermined in-focus range, the camera controller 212 performs control to record rating of two stars in the attribute regions. After completion of recording, the processing proceeds to step S712.

In step S711, since the result of the second focus detection is outside the predetermined in-focus range, the camera controller 212 performs control to record rating of one star in the attribute regions. In this way, in the present exemplary embodiment, the camera controller 212 evaluates the obtained still image data based on the focusing state of the still image data, and records information corresponding to the obtained evaluation in association with the still image data. After completion of recording, the processing proceeds to step S712.

In step S712, the camera controller 212 determines whether the image capturing operation mode is the still image continuous shooting mode. If it is determined that the image capturing operation mode is the still image continuous shooting mode (YES in step S712), the processing proceeds to step S713 to determine a next operation in the process of the continuous shooting operation. If it is determined that the image capturing operation mode is other than the still image continuous shooting mode (NO in step S712), since the result of image capturing has been appropriately classified and completely recorded, the camera controller 212 ends the operation in the present exemplary embodiment.

In step S713, the camera controller 212 determines whether the switch SW2 of the operation switch 211 has been kept pressed for inputting of operation to continue continuous shooting or the switch SW of the operation switch 211 has been kept pressed for inputting of operation to perform control of the focus position again. If it is determined that the switch SW1 or SW2 has been kept pressed (YES in step S713), the processing returns to step S701, in which the transition to the mirror down state is performed and the first focus detection is performed again.

<Advantageous Effect>

As described above, in the present exemplary embodiment, the camera controller 212 evaluates the obtained still image data based on the focusing state of the still image data. With such processing performed, the user is enabled to classify still image data based on information about the obtained evaluation. This enables classifying images according to the focusing state of actually captured image data. Thus, this enables reducing the workload of classifying captured image data.

In the first exemplary embodiment, the result of the second focus detection and the predetermined in-focus range are compared with each other, rating corresponding to the focusing state is automatically performed with respect to image data obtained by image capturing, and the obtained rating is stored in association with image data. On the other hand, in a second exemplary embodiment, image classification can be performed by changing, according to the focusing state, a recording destination of an image obtained by image capturing determined according to a result of comparison between the result of the second focus detection and the predetermined in-focus range.

Figure 8:
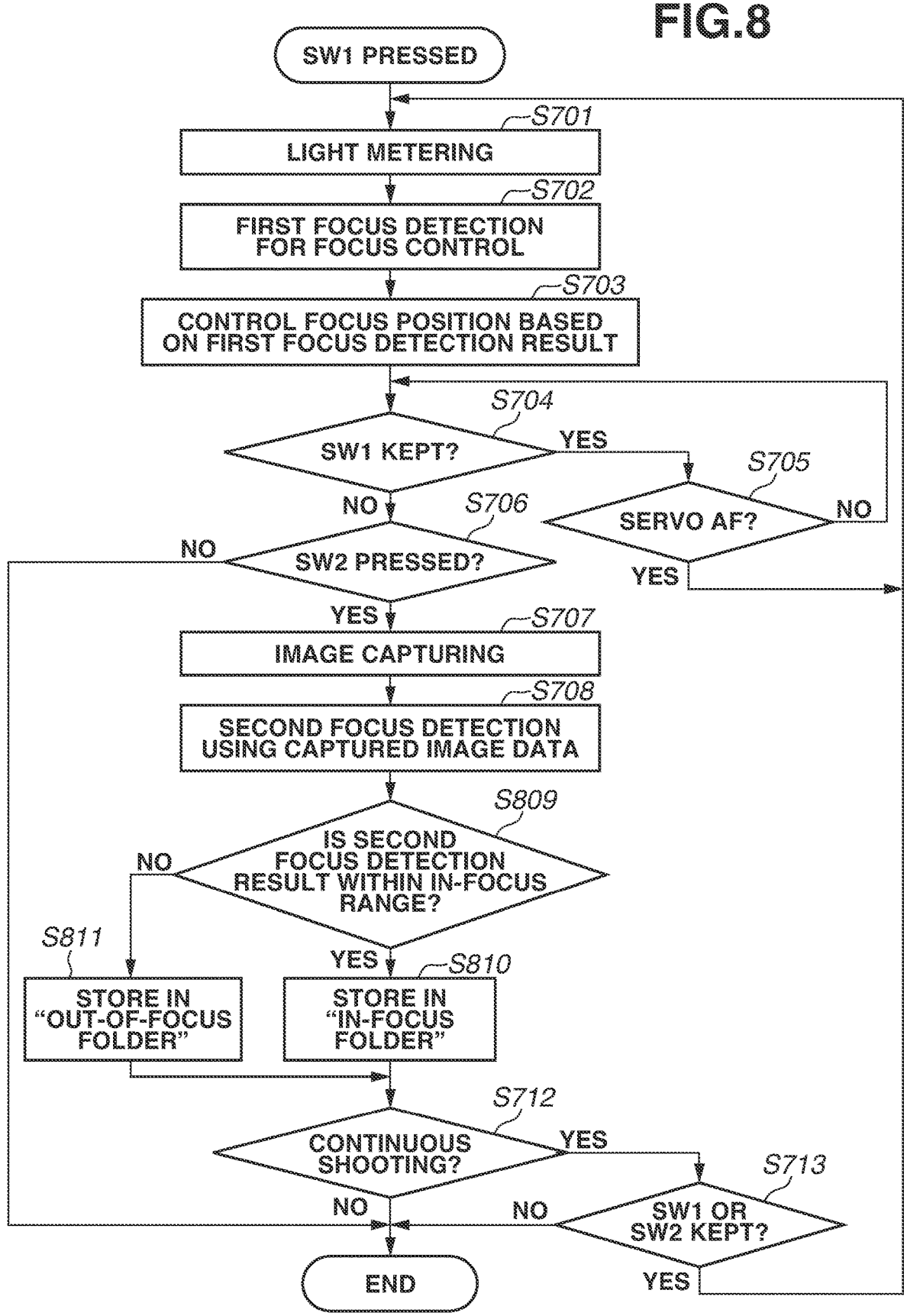
FIG. 8 is a flowchart illustrating the flow of an image capturing operation of the digital camera and a rating operation for images according to a second exemplary embodiment.

The second exemplary embodiment is described as follows with reference to FIG. 8. Furthermore, points in common between the second exemplary embodiment and the first exemplary embodiment are omitted from description as much as possible, and differences therebetween are mainly described.

If, in step S809, as in the first exemplary embodiment, it is determined that the result of the second focus detection is within the in-focus range (YES in step S809), the processing proceeds to step S810. If it is determined that the result of the second focus detection is not within the in-focus range (NO in step S809), the processing proceeds to step S811.

In step S810, the camera controller 212 performs control in such a manner that the second RAW data and the still image data recorded on the recording unit 219 are stored in an "in-focus folder" provided in the recording unit 219. In the present exemplary embodiment, the existence of the "in-focus folder" is defined in the table of contents (TOC) in a file allocation table (FAT) of the recording unit 219 structured by a known file system. Moreover, the camera controller 212 edits the TOC in such a manner that the recording unit 219 is able to associate the "in-focus folder" with recording information, such as the beginning address or data size of the second RAW data or still image data. After completion of these setting operations, the processing proceeds to step S712.

In step S811, the camera controller 212 performs control in such a manner that the second RAW data and the still image data recorded on the recording unit 219 are stored in an "out-of-focus folder" provided in the recording unit 219. The procedure of this processing is similar to that of processing in step S810 except that a folder serving as a storage location is not the "in-focus folder" but the "out-of-focus folder". After completion of the setting operations, the processing proceeds to step S712. The processing in step S712 and subsequent steps is similar to that in the first exemplary embodiment.

<Advantageous Effect>

As described above, in the second exemplary embodiment, the camera controller 212 automatically changes a storage folder serving as a recording destination of the obtained still image data based on the focusing state of the still image data. With such processing performed, still image data is classified based on information about the evaluation. Thus, this enables reducing the workload of classifying captured image data.

In the first exemplary embodiment, an example in which the camera controller 212 performs control in such a manner that the second focus detection is performed in the interior of the digital camera has been described. On the other hand, in a third exemplary embodiment, an example in which the second focus detection is performed by executing software in an apparatus provided outside the digital camera and rating corresponding to the focusing state is performed with respect to image data based on a focus detection result is described. In the present exemplary embodiment, the recording unit 219 of the digital camera is caused to connect to an external personal computer (PC), focus detection that is based on second RAW data is performed by software on the external computer, and rating of images is performed via software according to a focus detection result.

In the present exemplary embodiment, second RAW data having signals of focus detection pixels obtained by pupil division in a manner similar to that in the first exemplary embodiment is previously stored in the recording unit 219, which is a removable storage medium. Furthermore, the aperture value used at the time of image capturing, the reference lens driving amount at the focus position used at the time of recording, and the variation magnification at the focus position used at the time of recording are also stored in association with the second RAW data.

<Configuration of Apparatus for Classifying Image Data>

Figure 9:
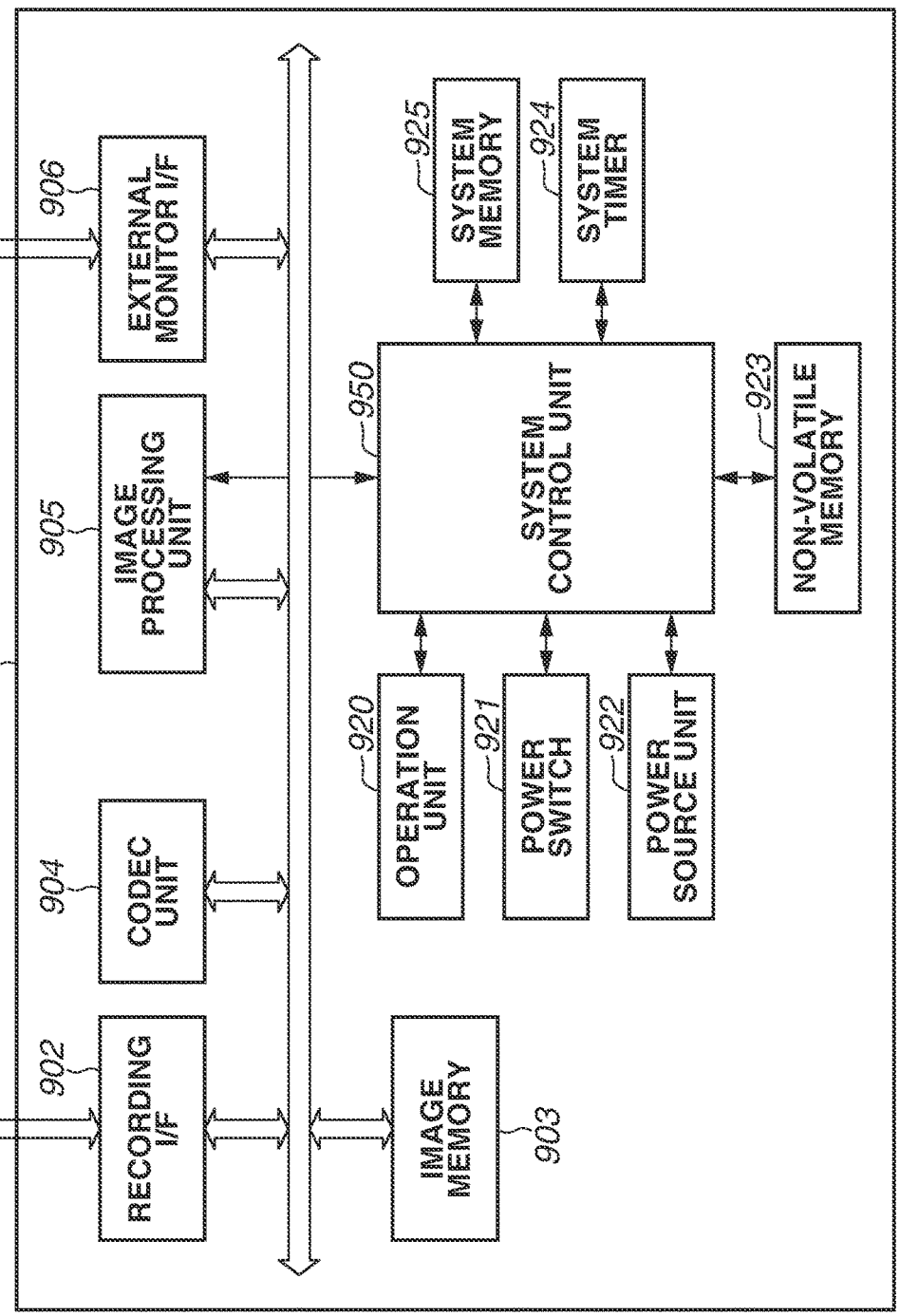
FIG. 9 is a diagram illustrating a configuration of a personal computer (PC) (a classification apparatus for image data) according to a third exemplary embodiment.

A configuration of the PC in the present exemplary embodiment is described. FIG. 9 is a block diagram illustrating the PC and peripherals thereof in the present exemplary embodiment.

A system control unit 950 receives image reading from the recording unit 219 in response to an operation performed by the user on an operation unit 920, such as a mouse, keyboard, and touch panel. Accordingly, the system control unit 950 reads image data recorded on the recording unit 219, which is detachably attached to the PC 900, into an image memory 903 via a recording interface (I/F) 902.

In a case where the image data read from the recording unit 219 is compression-coded data, the system control unit 950 transmits image data stored in the image memory 903 to a codec unit 904.

The codec unit 904 decodes compression-coded image data and then outputs the decoded image data to the image memory 903.

The system control unit 950 outputs, to an image processing unit 905, decoded image data stored in the image memory 903 or uncompressed image data of, for example, the Bayer RGB format (RAW format).

The system control unit 950 causes the image processing unit 905 to perform image processing on image data and stores an image processing result in the image memory 903.

Moreover, the system control unit 950 reads out an image-processed image from the image memory 903 and then outputs the read-out image to a monitor 300 via an external monitor interface (I/F) 906.

Furthermore, as illustrated in FIG. 9, the PC 900 includes a power switch 921, a power source unit 922, an electrically erasable and recordable non-volatile memory 923, and a system timer 924, which measures times used for various control operations and the time of a built-in clock. Moreover, the PC 900 further includes a system memory 925, onto which, for example, constants and variables used for the operation of the system control unit 950 and programs read out from the non-volatile memory 923 are loaded.

<Operation of Software>

Figure 10:
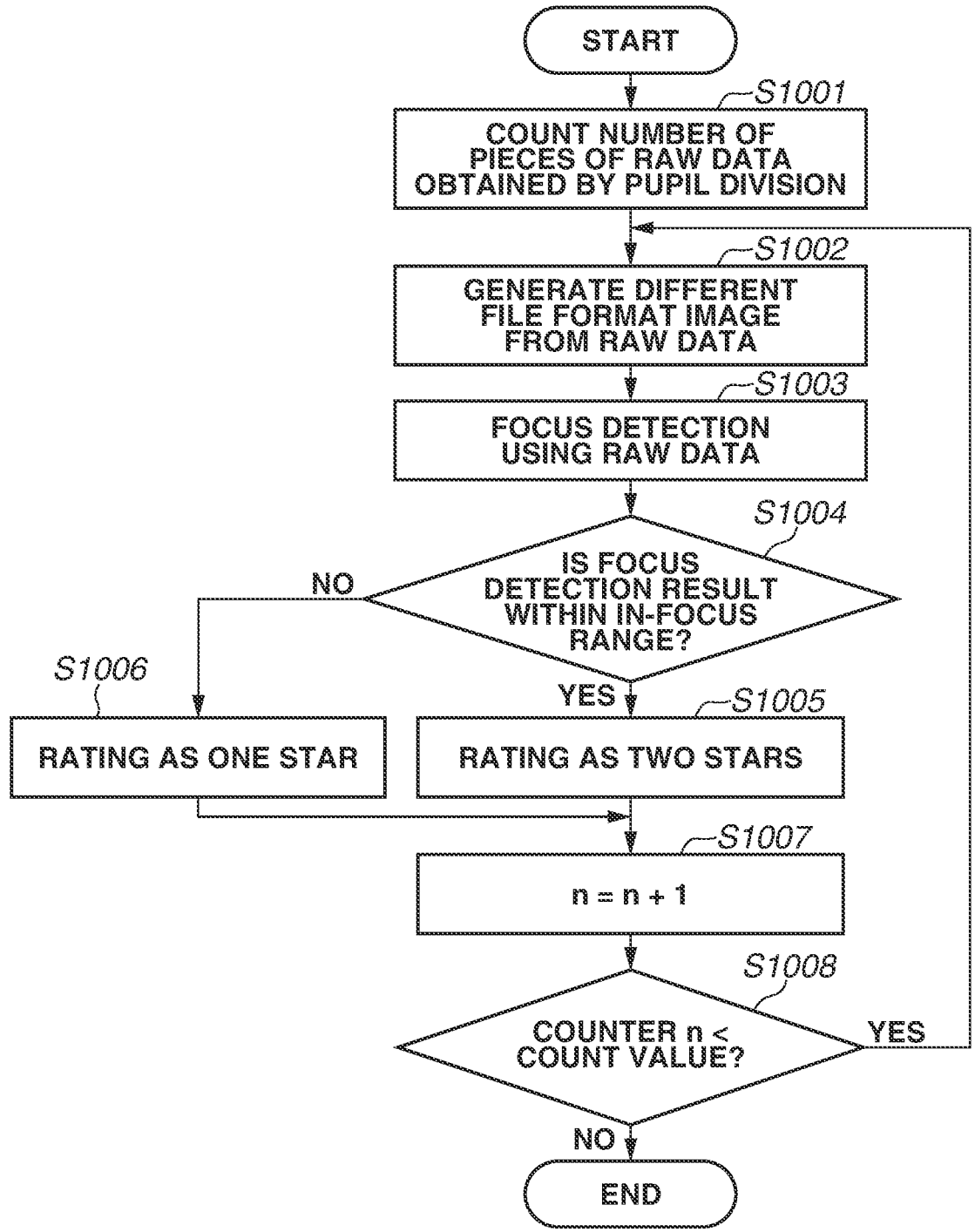
FIG. 10 is a flowchart illustrating the flow of a rating operation for images according to the third exemplary embodiment.

FIG. 10 is a flowchart illustrating the flow of a rating operation for images performed by software on an external computer in the present exemplary embodiment. The operation to be described below is implemented by the system control unit 950 loading software read out from the non-volatile memory 923 onto the system memory 925 and performing control to execute various operation steps of the software. For ease of description, in a part of the description, the software is used as the subject.

In the present exemplary embodiment, in an initial state immediately after activation, external software and the recording unit 219 of the digital camera are electrically interconnected and are able to communicate with each other, and the software is able to read out various pieces of data recorded on the recording unit 219.

First, when an operation input for starting rating of images on the software is performed by the user, the processing proceeds to step S1001.

In step S1001, all of the links to second RAW data of image data designated by an operation input on the software are read out and are then temporarily stored in a memory (not illustrated) present on an external computer. Then, the software counts the number of pieces of second RAW data temporarily stored in the recording unit 219. After completion of counting, the processing proceeds to step S1002.

In step S1002, the software focuses on one piece of second RAW data based on the links to the temporarily stored pieces of second RAW data, and reads out the focused-on one piece of second RAW data. Then, the software applies various image processing operations, such as known development processing, to the focused-on second RAW data, thus generating still image data of a known file format corresponding to the focused-on second RAW data. After completion of generation, the processing proceeds to step S1003.

In step S1003, the software performs focus detection on the focused-on second RAW data. Specifically, the software reads out signals of focus detection pixels obtained by pupil division, the aperture value used at the time of recording, the reference lens driving amount, and the variation magnification of the reference lens driving amount, stored in the focused-on second RAW data. Then, the software extracts an image region corresponding to a focus detection area from the focused-on second RAW data, and calculates a correlation amount for each shift amount of phase in each focus detection pixel raw of the focused-on second RAW data. After calculating the correlation amount for each shift amount, the software calculates a phase difference (also referred to as an image deviation amount) according to which the largest correlation amount is obtained. After calculating the phase difference, the software calculates a defocus amount by a known phase difference detection method based on the value of the phase difference, the aperture value, and the reference defocus amount. After calculation of the defocus amount, the processing proceeds to step S1004.

In step S1004, the software determines whether the defocus amount calculated based on the focused-on second RAW data is within a predetermined in-focus range. In the present exemplary embodiment, as an example, the predetermined in-focus range is a range of focus positions which are determined by defocus amounts of $-1\,F\delta$ to $+1\,F\delta$ [μm] when the aperture value is denoted by F and the permissible circle of confusion diameter is denoted by $\delta$ [μm]. If it is determined that the defocus amount is within the predetermined in-focus range (YES in step S1004), the processing proceeds to step S1005. If it is determined that the defocus amount is not within the predetermined in-focus range (NO in step S1004), the processing proceeds to step S1006.

In step S1005, the system control unit 950 performs rating that is based on the absolute value of the defocus amount calculated in step S1003, with respect to the focused-on second RAW data and still image data corresponding thereto. Then, the system control unit 950 records a rating obtained as a result of rating in attribute regions of the second RAW data and the still image data. An example of the attribute region in the present exemplary embodiment includes a region described in step S710 illustrated in FIG. 7 in the first exemplary embodiment, which is a region which is allowed to be edited later by the user with ease. In the present exemplary embodiment, as an example of rating, a case where an in-focus state is set as two stars and an out-of-focus state is set as one star is described. Furthermore, in the present exemplary embodiment, to make a distinction from image data that is not yet rated, the system control unit 950 does not bother to handle an out-of-focus state as no stars. In step S1005, since the calculated defocus amount is within the predetermined in-focus range, the system control unit 950 performs control to record rating of two stars in the attribute regions. After completion of recording, the processing proceeds to step S1007.

In step S1006, since the defocus amount calculated in step S1003 is outside the predetermined in-focus range, the system control unit 950 records rating of one star in the attribute regions. In this way, in the present exemplary embodiment, the system control unit 950 evaluates the obtained still image data based on the focusing state of the obtained still image data, and records information corresponding to the obtained evaluation in association with the still image data. After completion of recording, the processing proceeds to step S1007.

In step S1007, the software adds a value "1" to the counter n of the second RAW data about which focus detection has ended. After completion of addition, the processing proceeds to step S1008.

In step S1008, the software determines a magnitude relationship between the counter n of the second RAW data about which focus detection has ended and the number of pieces of second RAW data counted in step S1001, i.e., the count value. If it is determined that the counter n is smaller than the count value (YES in step S1008), the processing returns to step S1002 so as to perform image processing and focus detection on second RAW data that is not yet focused on. Then, the software performs the above-described processing on all of the pieces of temporarily stored second RAW data.

If it is determined that the counter n is equal to or larger than the count value (NO in step S1008), since all of the pieces of second RAW data stored in the designated folder of the recording unit 219 of the digital camera have been read out, the software ends the operation in the present exemplary embodiment.

<Advantageous Effect>

In the present exemplary embodiment, an external apparatus outside the digital camera performs second focus detection, and performs rating based on a result of the second focus detection. Since processing about rating is performed not by the digital camera but by the external apparatus, such an advantageous effect that a processing load can be reduced during image capturing performed by the digital camera and, as in the first exemplary embodiment, the user is allowed to classify still image data based on information about the evaluation can be obtained. Since images become able to be classified based on the focusing state of actually captured image data, a workload of classifying actually captured image data can be reduced.

In the above-described exemplary embodiments, the manner in which a focus detection area of the focus detection unit 209 illustrated in FIG. 1 is fixed to one place, such as a central portion in the angle of view of a captured image, has been described as an example. However, the exemplary embodiments do not need to be limited to this manner. In a fourth exemplary embodiment, an example in which processing for rating is performed in a configuration in which focus detection is performed in a plurality of focus detection areas in the angle of view of a captured image is described.

<Configuration of Digital Camera>

Figure 11:
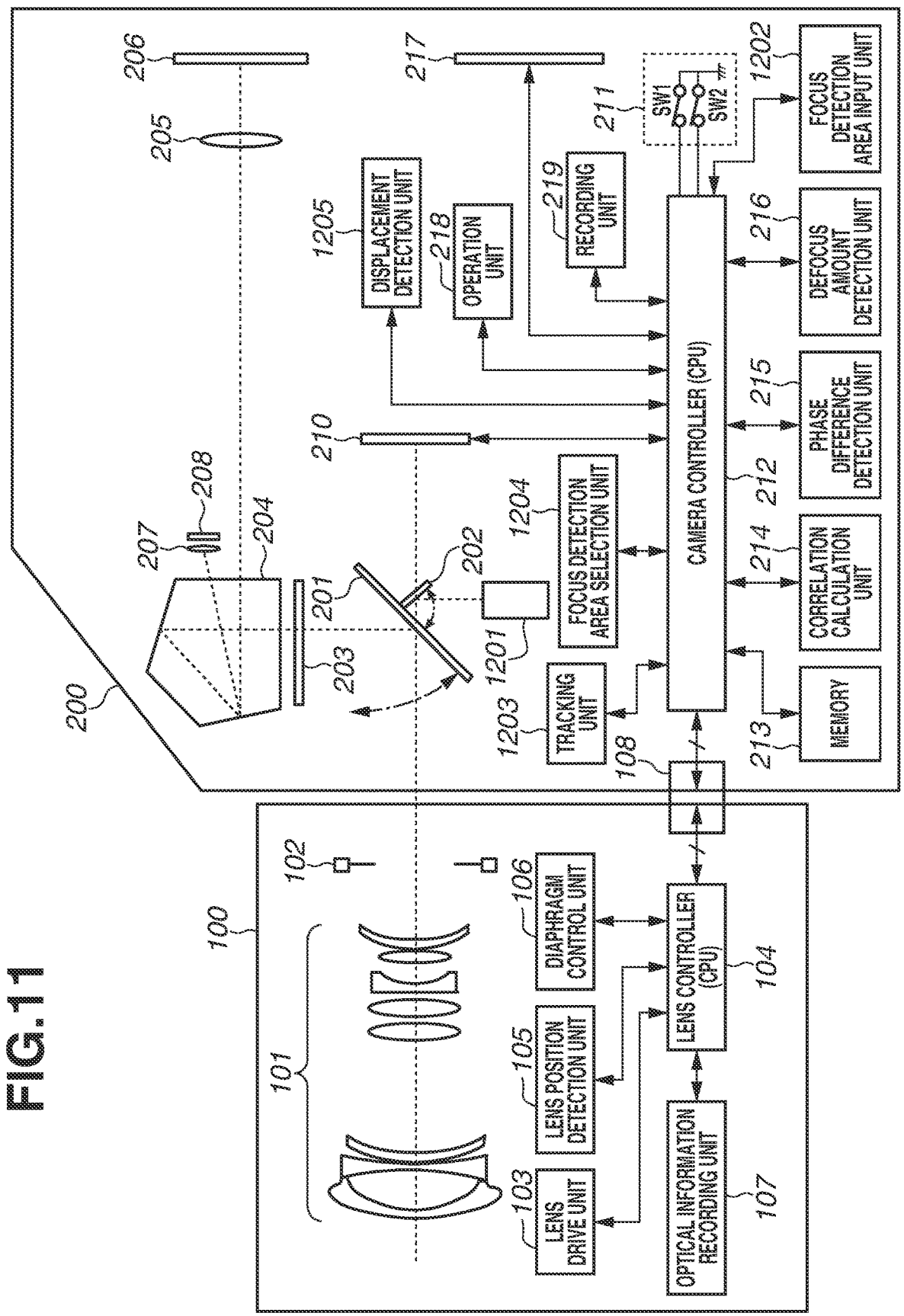
FIG. 11 is a diagram illustrating a configuration of a digital camera serving as an example of an imaging apparatus according to a fourth exemplary embodiment.

FIG. 11 is a diagram illustrating a configuration of a digital camera serving as an example of an imaging apparatus according to the fourth exemplary embodiment. Furthermore, the same constituent elements as those illustrated in FIG. 1 in the first exemplary embodiment are assigned the respective same reference numerals.

A difference from that illustrated in FIG. 1 is that the focus detection unit 209 illustrated in FIG. 1 is replaced by a multipoint focus detection unit 1201, which performs focus detection with respect to a plurality of focus detection areas.

Moreover, besides, the digital camera includes a focus detection area input unit 1202, which receives an operation input for allowing the user to perform selection from a plurality of focus detection areas, and a tracking unit 1203, which identifies an image region of a subject described below and tracks a position thereof on an image plane. Moreover, besides, the digital camera includes a focus detection area selection unit 1204, which finally selects a focus detection area used at the time of focus detection based on an operation input result of the focus detection area input unit 1202 and a tracking result of the tracking unit 1203.

Moreover, besides, the digital camera includes a displacement detection unit 1205, which detects or the movement of the digital camera in the present exemplary embodiment caused by camera shake or composition change. The displacement detection unit 1205 is configured with a known acceleration sensor, angular velocity sensor, or angular acceleration sensor, and is able to detect the displacement of the digital camera, for example, in six axes of {yaw, pitch, roll, backward and forward, rightward and leftward, and upward and downward}.

<Focus Detection Areas of Focus Detection Unit 1201>

Figure 12:
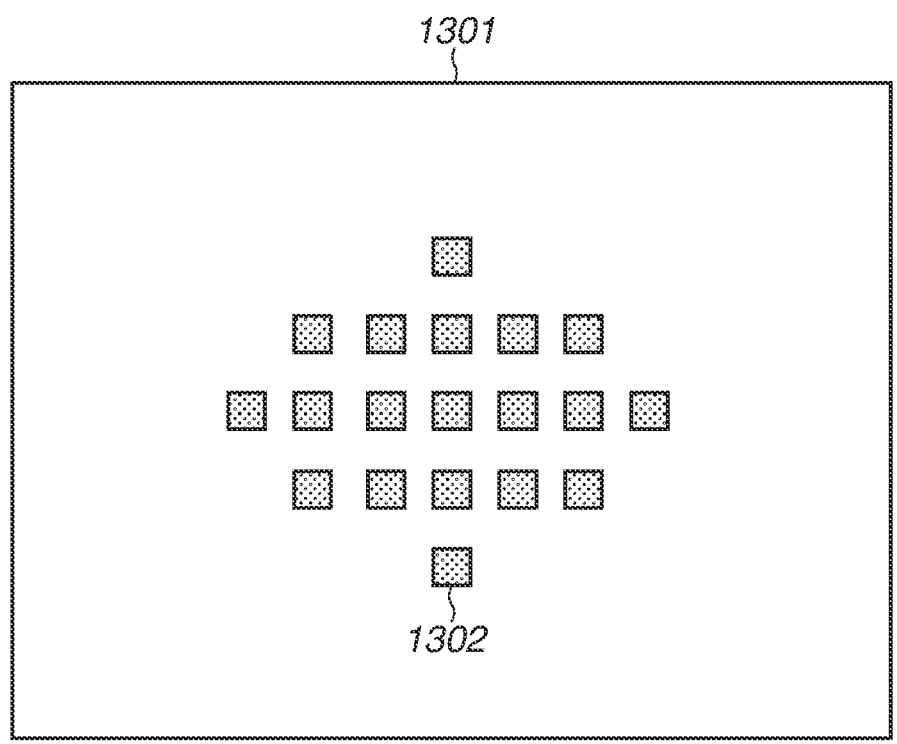
FIG. 12 is a schematic view illustrating a plurality of focus detection areas which is selectable by a multipoint focus detection unit.

FIG. 12 is a schematic view illustrating a plurality of focus detection areas which is able to be selected by the multipoint focus detection unit 1201. In a two-dimensional captured image plane 1301, which is recorded by image capturing, a plurality of focus detection areas 1302 each of which is indicated by a shaded rectangular is arranged. If a subject image is located on some focus detection areas 1302 in the captured image plane 1301, focus detection is able to be performed on a subject with use of the multipoint focus detection unit 1201.

Moreover, focus detection is performed with use of image signals of the imaging section 210 respectively corresponding to a plurality of focus detection areas 1302 based on the center of the optical axis of incident light rays and the orientation of an erected image in an imaging region of the imaging section 210.

<Operation of Digital Camera>

Figure 13:
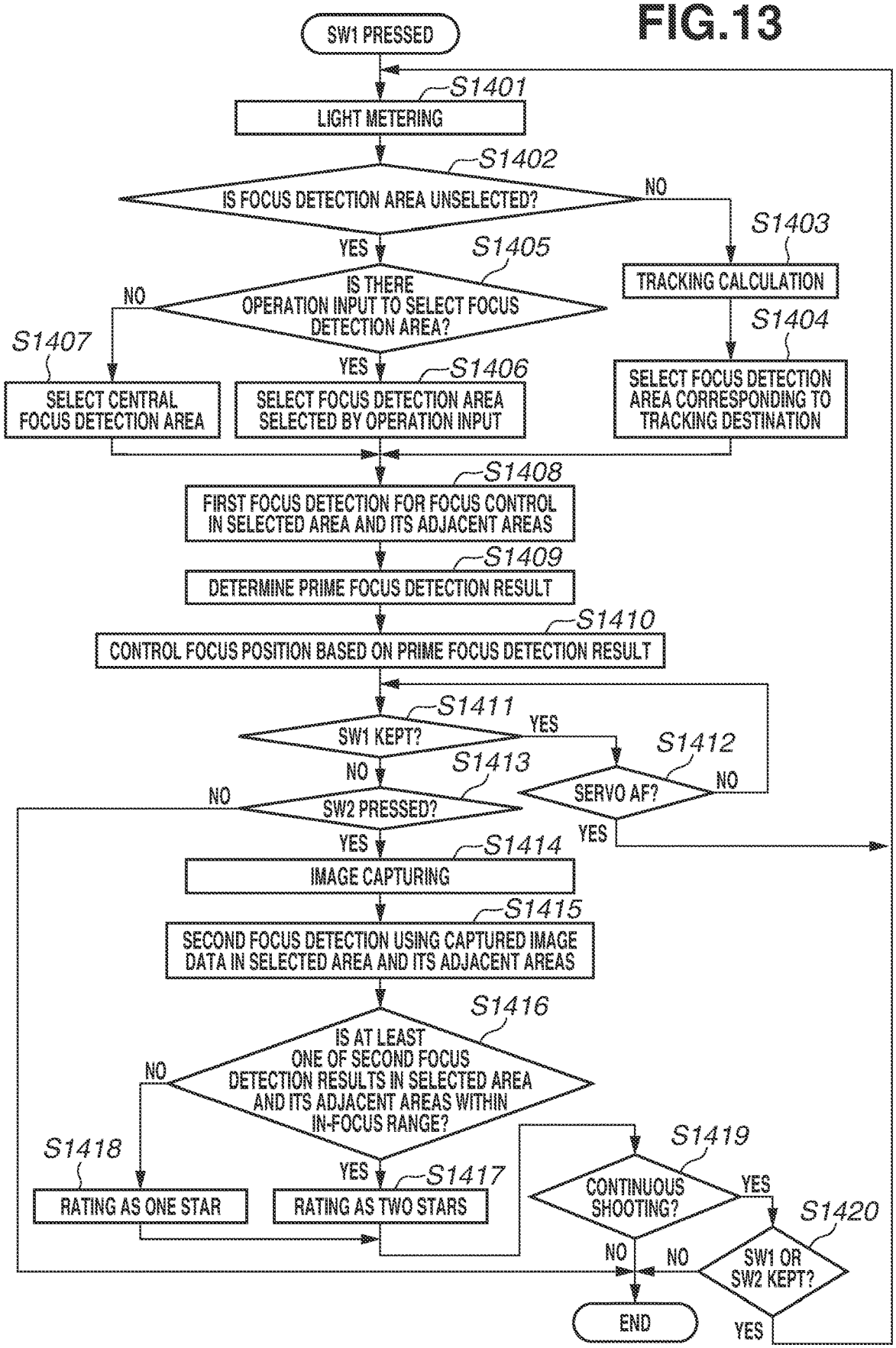
FIG. 13 is a flowchart illustrating the flow of an image capturing operation of the digital camera and a rating operation for images according to the fourth exemplary embodiment.

FIG. 13 is a flowchart illustrating the flow of an image rating operation of the digital camera in the present exemplary embodiment. The present operation is implemented by the camera controller 212 controlling each unit or section.

In an initial state immediately after being powered on, the digital camera in the present exemplary embodiment is in a state in which the still image one-shot mode or the still image continuous shooting mode is set. Moreover, the digital camera is in the mirror down state and the user is allowed to check a subject image by looking into the viewfinder 206.

First, in response to the switch SW1 of the operation switch 211 being pressed by the user, the operation in the present exemplary embodiment is started, so that the processing proceeds to step S1401.

In step S1401, the light metering sensor 208 performs first light metering, thus obtaining a first light metering result and temporarily storing a two-dimensional black-and-white multi-gradation image in the memory 213. After completion of temporary storage, the processing proceeds to step S1402.

In step S1402, the camera controller 212 determines whether all of the focus detection areas are unselected by the focus detection area selection unit 1204 (whether an initial selective state is set). If it is determined that any focus detection area has already been selected (NO in step S1402), the processing proceeds to step S1403. If it is determined that any selection has not yet been performed (YES in step S1402), the processing proceeds to step S1405.

In step S1403, the tracking unit 1203 performs a known calculation for performing tracking to determine where a subject image present in the last selected focus detection area is currently situated. In the still image one-shot mode or the still image continuous shooting mode, since the mirror down state is set, part of light rays having passed through the lens group 101 and the diaphragm 102 are caused by the light metering image-forming lens 207 to form an image on the light metering sensor 208. In the light metering sensor 208, a two-dimensional black-and-white multi-gradation image is obtained by photoelectric conversion elements (not illustrated) and is then temporarily stored in the memory 213. The tracking unit 1203 acquires the most recent black-and-white multi-gradation image temporarily stored in the memory 213 in step S1401 and the second most recent black-and-white multi-gradation image temporarily stored therein, and performs a known pattern matching-type tracking calculation which focuses on a subject image present in the last selected focus detection area. The tracking unit 1203 calculates a motion vector of the focused-on subject image as a result of the tracking calculation. After completion of calculation, the processing proceeds to step S1404.

In step S1404, the focus detection area selection unit 1204 selects, as an area used for finally performing focus detection, a focus detection area closest to a movement destination in a plurality of focus detection areas 1302 based on the motion vector of the focused-on subject image. After completion of selection, the processing proceeds to step S1408.

In step S1405, the digital camera is in a state in which any focus detection area has not yet been finally selected in the focus detection area selection unit 1204. Therefore, as information for making a determination to finally select a focus detection area, the focus detection area selection unit 1204 determines whether the user has performed an operation input to select a focus detection area via the focus detection area input unit 1202. For this purpose, the focus detection area input unit 1202 detects an operation input state. If it is determined that the operation input has been performed (YES in step S1405), the processing proceeds to step S1406. If it is determined that the operation input has not been performed (NO in step S1405), the processing proceeds to step S1407.

In step S1406, since a focus detection area has been selected by the user via the focus detection area input unit 1202, the focus detection area selection unit 1204 finally selects the focus detection area selected by the user. After completion of selection, the processing proceeds to step S1408.

In step S1407, the digital camera is in a state in which no focus detection area is selected by the focus detection area selection unit 1204 and the operation input state has not been detected by the focus detection area input unit 1202. In this case, the focus detection area selection unit 1204 assumes that the user is locating a subject in the vicinity of the center of the captured image plane 1301 and thus finally selects a central focus detection area in a plurality of focus detection areas 1302. After completion of selection, the processing proceeds to step S1408.

In step S1408, the focus detection unit 1201 performs first focus detection at the focus detection area selected by the focus detection area selection unit 1204 and focus detection areas adjacent to the selected focus detection area, thus obtaining a first focus detection result. After completion of the first focus detection, the processing proceeds to step S1409.

In step S1409, the camera controller 212 determines a prime focus detection result from among a focus detection result corresponding to the focus detection area selected in step S1408 and focus detection results respectively corresponding to the focus detection areas adjacent to the selected focus detection area. The method for determination can be a method which is performed in known multipoint automatic focus control. For example, a focus detection result indicating the closest distance can be determined to be a prime result. Moreover, the most average focus detection result from among results of the first focus detection can be determined to be a prime result. After a prime focus detection result is determined, the processing proceeds to step S1410.

In step S1410, the camera controller 212 controls the focus position of the lens group 101 based on the prime focus detection result. Specifically, the camera controller 212 acquires the current aperture value via the lens controller 104. Furthermore, the camera controller 212 acquires the reference lens driving amount and the variation magnification of the reference lens driving amount via the lens controller 104. The camera controller 212 calculates a focus real driving amount for attaining an in-focus state based on the first focus detection result obtained in step S1408 and the acquired aperture value, reference lens driving amount, and variation magnification thereof, and transmits the calculated focus real driving amount to the lens controller 104. The lens controller 104 controls the focus position of the lens group 101 via the lens drive unit 103 based on the received focus real driving amount. After completion of control of the focus position, the processing proceeds to step S1411.

In step S1411, the camera controller 212 detects the operation input state of the operation switch 211 and determines whether the switch SW1 is being kept. If it is determined that the switch SW1 is being kept (YES in step S1411), the processing proceeds to step S1412. If it is determined that the switch SW1 is not being kept (NO in step S1411), the processing proceeds to step S1413.

In step S1412, the camera controller 212 determines whether the focus detection mode is the servo AF mode. If it is determined that the focus detection mode is the servo AF mode (YES in step S1412), the processing returns to step S1401 to repeatedly perform light metering, determination of a focus detection area, focus detection, and control of the focus position until the switch SW2 of the operation switch 211 is pressed. If it is determined that the focus detection mode is the one-shot AF mode (NO in step S1412), the processing returns to step S1411 to continue monitoring the kept state of the switch SW1 of the operation switch 211 while fixing the focus position.

In step S1413, the camera controller 212 detects the operation input state of the operation switch 211 and determines whether the operation switch 211 has been pressed deep to the switch SW2. If it is determined that the operation switch 211 has been pressed to the switch SW2 (YES in step S1413), the processing proceeds to step S1414 so as to perform an image capturing operation described below. If it is determined that the operation switch 211 has not been pressed to the switch SW2 (NO in step S1413), since it is determined in step S1411 that the switch SW1 is not being kept and, therefore, the operation switch 211 has been returned to an initial state in which the switches SW1 and SW2 are released, the camera controller 212 ends the operation in the present flow.

In step S1414, the camera controller 212 performs control to bring the main mirror 201 and the sub-mirror 202 into a mirror up state so as to cause light rays of a subject image to fall on the imaging section 210. The imaging section 210 performs an image capturing operation for acquiring image data for recording based on the electric charge accumulation time and the ISO sensitivity determined from the light metering result obtained in step S1401.

The imaging section 210 acquires a captured image signal by photoelectrically converting an incident subject image, thus generating first RAW data, which is image data obtained by pupil division. The generated first RAW data is transferred to the memory 213. Moreover, besides this, the camera controller 212 generates second RAW data or still image data of a known file format (for example, a JPEG file). The camera controller 212 performs control to record the second RAW data and the still image data of a known file format on the recording unit 219. After completion of recording, the processing proceeds to step S1415.

<Rating of Image (Step S1415 to Step S1418)>

In step S1415, the camera controller 212 respectively performs second focus detection with respect to the focus detection area selected by the focus detection area selection unit 1204 and focus detection areas adjacent thereto with use of the first RAW data transferred to the memory 213. After completion of the second focus detection, the processing proceeds to step S1416.

In step S1416, the camera controller 212 determines whether at least one of second focus detection results is within a predetermined in-focus range. If it is determined that at least one focus detection result is included in the predetermined in-focus range (YES in step S1416), since this means that an in-focus subject is present, the processing proceeds to step S1417. If it is determined that at least one focus detection result is not included in the predetermined in-focus range (NO in step S1416), since this means that no in-focus subject is present, the processing proceeds to step S1418.

In step S1417, the camera controller 212 performs rating that is based on the smallest value of the absolute values of the defocus amounts in the respective focus detection areas calculated based on the second focus detection results with respect to the second RAW data and the still image data. Then, the camera controller 212 records a rating obtained as a result of rating in attribute regions of the second RAW data and the still image data. An example of the attribute region in the present exemplary embodiment includes a region described in step S710 illustrated in FIG. 7 in the first exemplary embodiment, which is a region which is allowed to be edited later by the user with ease. In the present exemplary embodiment, as an example of rating, a case where an in-focus state is set as two stars and an out-of-focus state is set as one star is described. Furthermore, in the present exemplary embodiment, to make a distinction from image data that is not yet rated, the camera controller 212 does not bother to handle an out-of-focus state as no stars. Since this step is performed in a case where the smallest value of the absolute values of the defocus amounts in the respective focus detection areas is within the predetermined in-focus range, the camera controller 212 performs control to record rating of two stars in the attribute regions. After completion of recording, the processing proceeds to step S1419.

In step S1418, since the smallest value of the absolute values of the defocus amounts in the respective focus detection areas calculated based on the second focus detection result is outside the predetermined in-focus range, the camera controller 212 records rating of one star in the attribute regions. After completion of recording, the processing proceeds to step S1419.

In step S1419, the camera controller 212 determines whether the image capturing operation mode is the still image continuous shooting mode. If it is determined that the image capturing operation mode is the still image continuous shooting mode (YES in step S1419), the processing proceeds to step S1420 to determine a next operation in the process of the continuous shooting operation. If it is determined that the image capturing operation mode is other than the still image continuous shooting mode (NO in step S1419), since the result of image capturing has been appropriately classified and completely recorded, the camera controller 212 ends the operation in the present exemplary embodiment.

In step S1420, the camera controller 212 determines whether the switch SW2 of the operation switch 211 has been kept pressed for inputting of operation to continue continuous shooting or the switch SW1 of the operation switch 211 has been kept pressed for inputting of operation to perform control of the focus position again. If it is determined that the switch SW1 or SW2 has been kept pressed (YES in step S1420), the processing returns to step S1401, in which the transition to the mirror down state is performed and the first light metering is performed again.

<Advantageous Effect>

As described above, in the above-described exemplary embodiment, first focus detection is performed with respect to a focus detection area selected based on a tracking result. After image data is acquired, second focus detection is performed on the acquired image data with respect to an area corresponding to the focus detection area selected in the first focus detection and areas adjacent to the corresponding area. Then, with use of an appropriate result from among the acquired plurality of second focus detection results, rating that is based on the absolute value of the defocus amount is performed on the second RAW data and the still image data. With this, even in a case where the position of a subject on the captured image plane obtained at the timing of the second focus detection has become different from the position thereof obtained at the timing of the first focus detection, rating to image data can be performed based on the focusing state about an intended subject.

In the above-described fourth exemplary embodiment, tracking processing for a subject is performed, a prime second focus detection result is determined from a focus detection area corresponding to a tracking destination and areas adjacent to the focus detection area, and rating of images is performed according to the focusing state of image data. With this, while the above-mentioned advantageous effect can be attained, an issue may arise in some cases. For example, in a situation where the accuracy of tracking processing becomes low, a case may be considered where, as a focus detection area to be selected, a focus detection area corresponding to not a person but an object present in, for example, a background is selected. In this case, since a focusing state corresponding to an intended subject is unable to be detected, rating may not be able to be appropriately performed. On the other hand, according to a fifth exemplary embodiment, even in a case where the accuracy of tracking processing has become low, rating is able to be appropriately performed. The fifth exemplary embodiment is more specifically described below.

<Configuration of Digital Camera>

Figure 14:
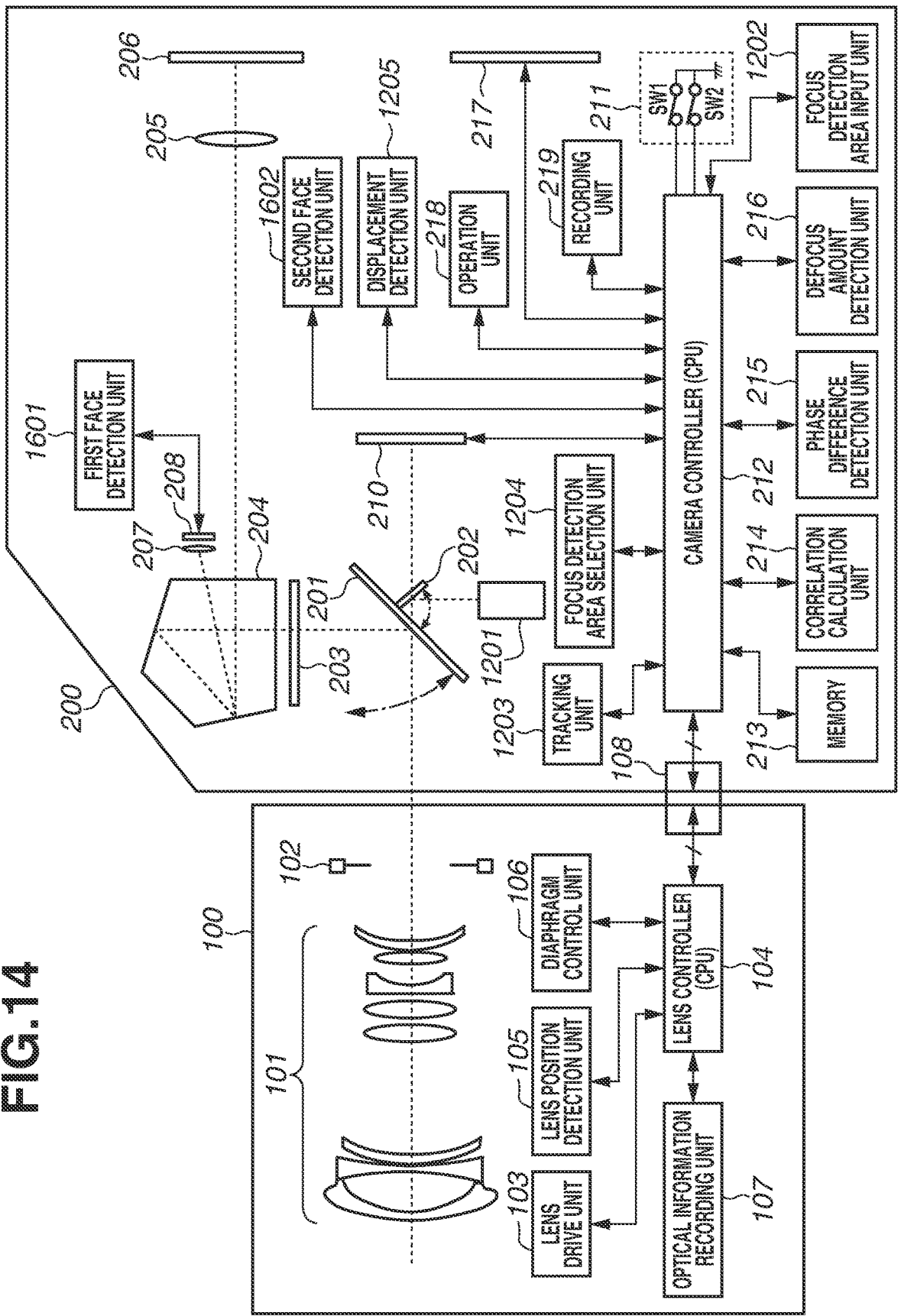
FIG. 14 is a diagram illustrating a configuration of a digital camera serving as an example of an imaging apparatus according to a fifth exemplary embodiment.

FIG. 14 is a diagram illustrating a configuration of a digital camera serving as an example of an imaging apparatus according to the fifth exemplary embodiment. Furthermore, the same constituent elements as those illustrated in FIG. 11 in the fourth exemplary embodiment are assigned the respective same reference numerals.

A difference from that illustrated in FIG. 11 is that the digital camera further includes a first face detection unit 1601, which detects a face from a subject image formed on the focusing screen 203 with use of an image signal obtained by the light metering sensor 208 for performing first light metering based on the subject image. Moreover, besides, a difference therefrom is that the digital camera further includes a second face detection unit 1602, which detects a face from a subject with use of an image signal obtained by the imaging section 210.

<Operation of Digital Camera>

Figure 15B:
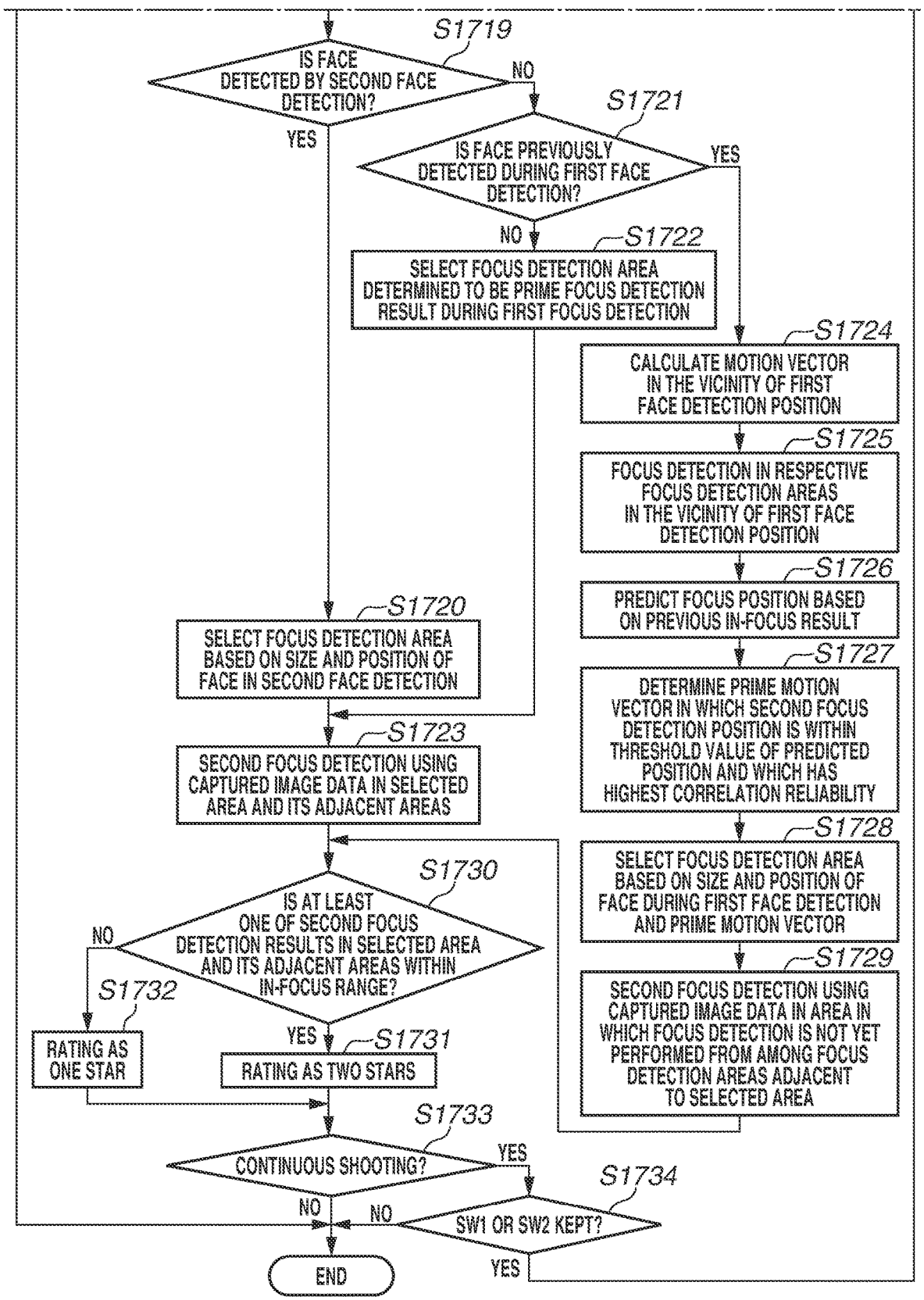
FIG. 15, which is composed of FIGS. 15A and 15B, is a flowchart illustrating the flow of an image capturing operation of the digital camera and a rating operation for images according to the fifth exemplary embodiment.

FIG. 15, which is composed of FIGS. 15A and 15B, is a flowchart illustrating the flow of an image rating operation of the digital camera in the present exemplary embodiment. The present operation is implemented by the camera controller 212 controlling each unit or section.

In an initial state immediately after being powered on, the digital camera in the present exemplary embodiment is in a state in which the still image one-shot mode or the still image continuous shooting mode is set. Moreover, the digital camera is in the mirror down state and the user is allowed to check a subject image by looking into the viewfinder 206.

First, in response to the switch SW1 of the operation switch 211 being pressed by the user, the operation in the present exemplary embodiment is started, so that the processing proceeds to step S1701.

In step S1701, the light metering sensor 208 performs first light metering, thus obtaining a first light metering result and temporarily storing a two-dimensional black-and-white multi-gradation image in the memory 213. After completion of temporary storage, the processing proceeds to step S1702.

In step S1702, the first face detection unit 1601 performs detection of a face from the first light metering result. The range for detecting a face in the first face detection unit 1601 is approximately equal to the visual field range in which a plurality of focus detection areas 1302 illustrated in FIG. 12 is arranged. After completion of face detection, the processing proceeds to step S1703.

In step S1703, the first face detection unit 1601 determines whether a face is undetected. If it is determined that a face has been detected (NO in step S1703), the processing proceeds to step S1704. If it is determined that a face has not been detected (YES in step S1703), the processing proceeds to step S1705.

In step S1704, the focus detection area selection unit 1204 selects a focus detection area most appropriately associated with the face from among a plurality of focus detection areas 1302 illustrated in FIG. 12, based on the position and size of the face detected by the first face detection unit 1601.

Furthermore, if the size of the face is equal to or larger than a predetermined threshold value, since the center of the face becomes increasingly likely to be a nose, which is at low contrast and on which focus detection is not easy, a focus detection area corresponding to the position of any one of right and left eyes is determined to be most appropriate and is thus selected. If the size of the face is smaller than the predetermined threshold value, since the eye, eyebrow, or mouth, which is at high contrast and on which focus detection is easy, becomes increasingly likely to be included in the center of the face, a focus detection area corresponding to the center of the face is determined to be most appropriate and is thus selected. The predetermined threshold value, which is compared with the size of the face, is previously determined based on whether, when the visual field of the focus detection area approximately corresponds to the face center as mentioned above, the face size is so small that a high contract region of the face is included in the visual field of the focus detection area. After completion of selection of the focus detection area, the processing proceeds to step S1711.

Steps S1705 to S1710 are operations which are performed in a case where a face has not been detected by the first face detection unit 1601 and are operations which correspond to steps S1402 to S1407 illustrated in FIG. 13, and, therefore, the description thereof is omitted here.

In step S1711, the focus detection unit 1201 performs first focus detection in the focus detection area selected by the focus detection area selection unit 1204 and focus detection areas adjacent to the selected focus detection area, thus obtaining a first focus detection result. After completion of the first focus detection, the processing proceeds to step S1712.

In step S1712, the camera controller 212 determines a prime focus detection result from among the focus detection area selected by the focus detection area selection unit 1204 and focus detection areas adjacent to the selected focus detection area. The method for determination can be a method which is performed in known multipoint automatic focus control. Specifically, for example, a focus detection result indicating the closest distance can be determined to be a prime result. Moreover, for another example, the most average focus detection result from among results of the first focus detection can be determined to be a prime result. The first focus detection result determined to be a prime result is stored and saved in the memory 213 for the past five times at most so as to be used for an operation in step S1724 described below. After a prime focus detection result is determined, the processing proceeds to step S1713.

In step S1713, the camera controller 212 controls the focus position of the lens group 101 based on the prime focus detection result. The specific method is the same as described in step S1410 illustrated in FIG. 13, and, therefore, the description thereof is omitted here. After completion of control of the focus position, the processing proceeds to step S1714.

Steps S1714 to S1716 are operations which correspond to steps S1411 to S1413 illustrated in FIG. 13, and, therefore, the description thereof is omitted here.

In step S1717, the camera controller 212 performs an operation which corresponds to step S1414 illustrated in FIG. 13. Furthermore, in the present exemplary embodiment, the memory 213 stores first RAW data for the past two pieces thereof at most for an operation in step S1724 described below. After completion of recording, the processing proceeds to step S1718.

In step S1718, the second face detection unit 1602 performs face detection with use of the first RAW data transferred to the memory 213. The range for detecting a face in the second face detection unit 1602 is approximately equal to the visual field range in which a plurality of focus detection areas 1302 illustrated in FIG. 12 is arranged. After completion of face detection, the processing proceeds to step S1719.

In step S1719, the camera controller 212 determines whether a face has been detected by the second face detection unit 1602. If it is determined that a face has been detected (YES in step S1719), the processing proceeds to step S1720. If it is determined that no face has been detected (NO in step S1719), the processing proceeds to step S1721.

In step S1720, the focus detection area selection unit 1204 selects, as a focus detection area for second focus detection, a region of first RAW data that is based on the position and size of the face detected by the second face detection unit 1602. After completion of selection, the processing proceeds to step S1723.

In step S1721, since no face has been detected by the second face detection unit 1602, the camera controller 212 further determines whether a face has been previously detected by the first face detection unit 1601. If it is determined that a face has been previously detected (YES in step S1721), the processing proceeds to step S1724. If it is determined that no face has been previously detected (NO in step S1721), the processing proceeds to step S1722.

Step S1722 is an operation which is performed in a case where no face has been detected by both the first face detection unit 1601 and the second face detection unit 1602. Specifically, the focus detection area selection unit 1204 selects, for second focus detection, a focus detection area located in a position corresponding to the focus detection area in the first focus detection determined to be a prime focus detection result in step S1712. After completion of selection, the processing proceeds to step S1723.

In step S1723, the camera controller 212 respectively performs second focus detection with respect to the focus detection area selected by the focus detection area selection unit 1204 and focus detection areas adjacent thereto with use of the first RAW data transferred to the memory 213. After completion of calculation of the defocus amount in each focus detection area by the second focus detection, the processing proceeds to step S1730.

Step S1724 is processing performed in a case where, while no face has been detected by the second face detection unit 1602, a face has been detected by the first face detection unit 1601. For example, a case may be considered where, when image capturing is performed on a rapidly moving person, the face is facing the digital camera 200 at the timing of the first focus detection, but, at the timing of the second focus detection, the face faces rearward and no face is able to be detected. In such a case, in the present exemplary embodiment, the face position obtained at the time when the first RAW data was acquired by image capturing is estimated based on the past face detection result. In the present step, to estimate the face position, the tracking unit 1203 calculates a motion vector in the vicinity of the face detection position obtained by the first face detection unit 1601 and a correlation reliability of the motion vector with use of the past first RAW data stored in the memory 213 in step S1717. Here, the vicinity of the face detection position is an area obtained by adding together a focus detection area corresponding to the face detection position obtained by the first face detection unit 1601 and focus detection areas adjacent to the corresponding focus detection area. The motion vector is calculated in relation to each focus detection area. Moreover, the correlation reliability is a value obtained by performing a known template matching method on two pieces of RAW data different in image capturing time to calculate a movement amount which minimizes a difference value of image signals and converting the difference value into a negative value by inverting the sign thereof. As a difference value of image signals corresponding to face detection positions of two pieces of RAW data becomes smaller and a degree of coincidence thereof becomes higher, the correlation reliability becomes higher. The obtained correlation reliability is then temporarily stored in the memory 231. After completion of calculation of the motion vector, the processing proceeds to step S1725.

In step S1725, the correlation calculation unit 214 performs second focus detection with respect to each of the focus detection areas focused on in step S1724, with use of the first RAW data transferred to the memory 213. After completion of focus detection, the processing proceeds to step S1726.

In step S1726, the camera controller 212 predicts the focus position of a subject obtained at the time of image capturing using a known multi-degree type prediction calculation based on the past focus detection result recorded and retained in the memory 213 by an operation performed in step S1712. After completion of the prediction calculation, the processing proceeds to step S1727.

In step S1727, the camera controller 212 extracts a focus detection area from which a focus detection result in which the focus position is within a predetermined range has been obtained, based on the focus position of a subject predicted in step S1726 in each focus detection area focused on in step S1724. Then, in the extracted focus detection area, the camera controller 212 determines a motion vector having the highest reliability by comparing reliabilities of motion vectors corresponding to the respective focus detection areas temporarily stored in the memory 213 in step S1725. After completion of determination, the processing proceeds to step S1728.

In step S1728, the camera controller 212 estimates a face position obtained at the time when the first RAW data was obtained, based on the face position detected by the first face detection unit 1601 and the motion vector determined to have the highest reliability in step S1727. Then, the camera controller 212 selects a focus detection area closest to the estimated face position. After completion of selection, the processing proceeds to step S1729.

In step S1729, the correlation calculation unit 214 performs second focus detection as in step S1725 with respect to a focus detection area in which focus detection is not yet performed in step S1725 from among focus detection areas adjacent to the focus detection area selected in step S1728. After completion of focus detection, the processing proceeds to step S1730.

In step S1730, the camera controller 212 determines whether at least one of the second focus detection results is within a predetermined in-focus range. If it is determined that at least one focus detection result is included in the predetermined in-focus range (YES in step S1730), since this means that an in-focus subject is present, the processing proceeds to step S1731. If it is determined that at least one focus detection result is not included in the predetermined in-focus range (NO in step S1730), since this means that no in-focus subject is present, the processing proceeds to step S1732.

Processing in steps S1731 to S1734 is similar to processing in steps S1417 to S1420 illustrated in FIG. 13, and, therefore, the description thereof is omitted here.

<Advantageous Effect>

As described above, in the above-described exemplary embodiment, a focus detection area for second focus detection is selected based on a face detection result obtained at timing corresponding to first focus detection and a face detection result obtained at timing corresponding to second focus detection. Rating processing is performed based on a second focus detection result in the thus-selected focus detection area. With this, even in a case where, for example, image capturing is performed on a moving subject, rating can be appropriately performed according to the focusing state of an intended subject.

Modification Examples

<Modification Example of Folder Classification>

In the third exemplary embodiment to the fifth exemplary embodiment, the second focus detection result and a predetermined in-focus range are compared with each other, and rating of image data obtained by image capturing is automatically changed according to the focusing state. On the other hand, as described in the second exemplary embodiment, image classification can be performed by changing a recording destination of an image obtained by image capturing according to a result of comparison between the second focus detection result and a predetermined in-focus range.

More specifically, processing similar to that in step S810 can be performed in steps S1005, S1417, and S1731 in the respective exemplary embodiments. Moreover, processing similar to that in step S811 can be performed in steps S1006, S1418, and S1732.

Performing such processing enables automatically changing a storage folder serving as a recording destination of an image obtained by image capturing, thus classifying images. This enables reducing a workload of classifying captured image data. The recording unit 219 can be requested to store only a captured image determined to be outside the predetermined in-focus range in a sub-folder named, for example, "out-of-focus folder". With such an operation performed, a captured image determined to be within the predetermined in-focus range is stored in a recording destination having the same folder configuration as usual, and the user can view images starting with an in-focus captured image by performing a usual folder opening operation.

Moreover, a plurality of in-focus threshold values can be provided in in a stepwise fashion, and classification can be performed in such a manner that rating is performed in multiple stages based on the second focus detection result. With this, classification can be performed in the order of, for example, {an unblurred image, a slightly blurred image, a definitely blurred image, and out of focus}, and, therefore, it becomes possible to set an environment in which the user is allowed to check images preferentially starting with a less blurred image, thus making work for checking images more efficient. While, in the above-described exemplary embodiments, rating in which the number of stars serving as a rating is set to "1" or "2" is performed, the exemplary embodiments are not limited to this. For example, in a setting operation, assuming that "five starts" is the supreme rating, if the absolute value of the defocus amount is equal to or less than 0.5 F$\delta$ [µm], the best rating of five stars can be set. Then, subsequently, every time the absolute value of the defocus amount increases 0.5 F$\delta$ [µm], the rating can be lowered, and, if 2 F$\delta$ [µm] is exceeded, the worst rating of one star can be set.

Moreover, in a case where serial numbers are used for file names in second RAW data or still image data of a known file format to be recorded in the recording unit 219, classifying images into new folders may break serial numbers, so that the order of image capturing may become unknown. Therefore, in addition to the above-described exemplary embodiment, in a case where, in the operation of the present exemplary embodiment, a new folder is created and an image is stored in the new folder, such control as not to reset a serial number can be performed. With such an operation performed, it becomes possible to know the order of image capturing afterward by referring to the file name.

Moreover, in a case where a camera shake larger than a predetermined value has been detected, a blurred image is likely to be obtained. Therefore, in response to the displacement of the digital camera in the present exemplary embodiment being detected by the displacement detection unit 1205, captured images can be uniformly classified into different folders. With such an operation performed, the user is allowed to perform checking work for images starting with an image more likely to be in focus.

Moreover, when a face detection unit (not illustrated) detects the size of a face, the camera controller 212 (serving as an example of a determination unit) can perform different control operations according to the size of the face. Specifically, the camera controller 212 can classify images into different folders. For example, if, while there is a difference larger than a predetermined value in the second focus detection result, the detected face is smaller than a predetermined value in such a way as to occupy only about half of the focus detection area, the presence of far and near objects in one frame may occur in focus detection. Moreover, a main subject is not limited to the face, and image classification can be performed based on the size which a subject, including an object, occupies in the captured image. With the above-described operation performed, the user is enabled to perform viewing and checking of images starting with a good image free of the presence of far and near objects in one frame.

<Modification Example Concerning Processing During Mirror Up>

Each of the still image one-shot mode and the still image continuous shooting mode, which have been described in the above-described exemplary embodiments, is a mode in which the first focus detection is performed in a mirror down state (a first mode). Here, additionally, a mode in which the first focus detection is performed in a mirror up state (a second mode) can be provided. A live view mode and a moving image capturing operation mode, in which the first focus detection is performed in a mirror up state, differ from the still image one-shot mode and the still image continuous shooting mode in that the main mirror 201 and the sub-mirror 202 are controlled to be kept in a mirror up state.

When switching to the live view mode is performed by the operation input of the operation unit 218, the main mirror 201 and the sub-mirror 202 are controlled to enter into a mirror up state. Moreover, in the live view mode, the imaging section 210 continuously performs an image capturing operation with a predetermined period such as 60 times per second, and a subject image is displayed on the display unit 217 with use of the obtained captured image signal. When the switch SW1 of the operation switch 211 is pressed in the live view mode, a first light metering operation, which measures the luminance of a subject image with use of a captured image signal obtained by the imaging section 210, is performed, and the aperture of the diaphragm 102 and the electric charge accumulation time and ISO sensitivity of the imaging section 210 are controlled based on the first light metering result. Moreover, when the switch SW1 is pressed in the live view mode, following the first light metering operation, first focus detection, which is focus detection that is based on captured image signal data obtained by pupil division, is performed, and the focus position of the lens group 101 is controlled based on the first focus detection result. When, in the live view mode, the operation switch 211 is pressed deep to the switch SW2 from the pressed state of the switch SW1, the imaging section 210 performs an image capturing operation for recording, and, then, the imaging section 210 generates first RAW data, which is image data obtained by pupil division, from a captured image signal obtained by photoelectrically converting an incident subject image. The generated first RAW data is converted into a predetermined RAW file format by the camera controller 212 to obtain second RAW data for recording, which is then recorded on the recording unit 219. Image data obtained by pupil division is stored in the second RAW data. Moreover, the generated first RAW data is obtained as still image data of a known file format by a pair of pixel signals obtained by pupil division being added together by the camera controller 212 and being subjected to image processing such as a known developing calculation, and is then recorded on the recording unit 219. Moreover, the generated first RAW data is transferred to the memory 213 and is then used for second focus detection, which is focus detection that is based on image data obtained by pupil division. Moreover, a second light metering operation, which measures the luminance of a subject with use of a captured image signal output from the imaging section 210, is performed and the aperture of the diaphragm 102 and the electric charge accumulation time and ISO sensitivity of the imaging section 210 are controlled based on the second light metering result.

When switching to the moving image recording mode is performed by the operation input of the operation unit 218, the main mirror 201 and the sub-mirror 202 are controlled to enter into a mirror up state. Moreover, in the moving image recording mode, the imaging section 210 continuously performs an image capturing operation with a predetermined period such as 60 times per second, and a subject image is displayed on the display unit 217 with use of the obtained captured image signal. When the operation input for starting moving image recording is performed via the operation unit 218 in the moving image recording mode, the imaging section 210 generates first RAW data, which is image data obtained by pupil division, from the captured image signal. The generated first RAW data is obtained as moving image data of a known file format by a pair of pixel signals obtained by pupil division being added together by the camera controller 212 and being subjected to image processing such as a known developing calculation, and is then recorded on the recording unit 219. Moreover, the generated first RAW data is transferred to the memory 213 and is then used for first focus detection, which is focus detection that is based on image data obtained by pupil division. Moreover, a second light metering operation, which measures the luminance of a subject with use of a captured image signal output from the imaging section 210, is performed and the aperture of the diaphragm 102 and the electric charge accumulation time and ISO sensitivity of the imaging section 210 are controlled based on the second light metering result.

In the still image one-shot mode and the still image continuous shooting mode, first focus detection for determining a control target of the focus position is performed with use of the focus detection unit 209 in the mirror down state. However, in the live view mode and the moving image recording mode, the first focus detection is not limited to this, and, in a case where the image capturing operation mode is the live view mode, first focus detection is performed with use of a captured image signal in the mirror up state and a control target of the focus position is determined based on the result thereof. In this case, it is meant that the focus position of a subject image recorded in the above-mentioned second RAW data or still image data is a focus position for which the lens group 101 is controlled based on a result of focus detection performed with use of a captured image signal obtained by an image capturing operation performed one time before.

Moreover, in the above-described exemplary embodiments, the first light metering for determining the electric charge accumulation time and ISO sensitivity of an image capturing operation is performed with use of the light metering sensor 208 in a mirror down state. However, the exemplary embodiments are not limited to this, and, in a case where the image capturing operation mode is the live view mode, the first light metering is performed with use of a captured image signal in a mirror up state and the electric charge accumulation time and ISO sensitivity of an image capturing operation are determined based on a result of the first light metering. In this case, it is meant that the amount of exposure of a subject image recorded in the above-mentioned second RAW data or still image data is an amount of exposure that is based on a result of light metering performed with use of a captured image signal obtained by an image capturing operation performed one time before.

Moreover, in a case where the image capturing operation mode is the live view mode, a tracking calculation is performed with use of a captured image signal in a mirror up state while the captured image signal is being temporarily stored in the memory 213. Then, the focus detection area selection unit 1204 finally selects a focus detection area closest to the movement destination of a subject, as an area from which focus detection is performed, from among a plurality of focus detection areas 1302 based on a result of the tracking calculation using the captured image signal.

<Modification Example Concerning Selection of Focus Detection Area for Second Focus Detection>

Moreover, in the above-described exemplary embodiments, in the second focus detection, focus detection is performed in a focus detection area selected by the focus detection area selection unit 1204 and focus detection areas adjacent to the selected focus detection area, and image classification is performed according to whether any one of focus detection results thereof is within a predetermined in-focus range. However, the exemplary embodiments are not limited to this, and, in a case where the aperture value of the diaphragm 102 is a value nearer the maximum aperture than a predetermined value, the camera controller 212 makes a calculation to determine whether a predetermined or more difference is calculated between respective focus detection results of the selected focus detection area and its adjacent focus detection areas. Then, image classification can be performed according to a result of such a determination. For example, in a case where a predetermined or more difference has been calculated, this means that a captured image with a composition large in focus difference has been obtained, so that the captured image is classified into a folder named "large bokeh". Moreover, in a case where a predetermined or more difference has not been calculated, this means that a captured image with a composition small in focus difference has been obtained, so that the captured image is classified into a folder named "small bokeh". With such an operation performed, it becomes possible to perform image classification according to whether the captured image is an image intended by the user.

<Modification Example in a Case where the Number of Times of Focus Detection is Increased>

In the above-described exemplary embodiments, first focus detection is performed at the time prior to timing of image capturing, and, after the focus position is controlled based on the first focus detection, an image capturing operation for recording is performed. However, the exemplary embodiments are not limited to this, and, after the focus position is controlled based on the first focus detection, focus detection can be performed again and the focusing state obtained at that timing can be checked. With such an operation performed, in a case where the result of focus detection performed again is not an in-focus state, control of the focus position can be re-performed, and the possibility of the focus position in image capturing for recording being in focus can be increased. Furthermore, here, a time difference still occurs between the timing of performing focus detection again after control of the focus position and the timing of image capturing for recording performed after that. Therefore, the possibility of a captured image becoming blurred may remain. Accordingly, as described in the above-described exemplary embodiments, second focus detection using a captured image for recording is performed, so that the focusing state of the captured image can be more accurately detected.

<Modification Example Concerning Focus Detection Method>

Moreover, in the above-described exemplary embodiments, focus detection of the phase difference detection method is performed as the first focus detection and the second focus detection. However, the exemplary embodiments are not limited to this, and, for example, a known Depth From Defocus (DFD) method discussed in Japanese Patent Application Laid-Open No. 2016-18116 or other focus detection methods can be employed. With such an operation performed, advantageous effects similar to those in the above-described exemplary embodiments can be attained.

Moreover, if the image capturing control mode is the live view mode or the moving image recording mode, focus detection of the contrast evaluation method, which is based on high-frequency components of a subject image, can be performed as the first focus detection or the second focus detection. In this case, a contrast evaluation level in the first focus detection is temporarily stored, and the camera controller 212 determines whether the detection result of the second focus detection is at a level between levels slightly larger and smaller than the contrast evaluation level, such as between 95% and 110% thereof inclusive. If the detection result of the second focus detection is at a level between levels slightly larger and smaller than the contrast evaluation level, the detection result of the second focus detection is determined to be within an in-focus range, so that the captured image is controlled by the recording unit 219 in such a way as to be associated with the "in-focus folder". If the detection result of the second focus detection is not at a level between levels slightly larger and smaller than the contrast evaluation level, the captured image is controlled by the recording unit 219 in such a way as to be associated with the "out-of-focus folder". Here, if image data for the first focus detection and image data for the second focus detection differ in number of pixels, in other words, if they differ in spatial frequency, the contrast evaluation level in the first focus detection is multiplied by a coefficient corresponding to the difference in spatial frequency. This enables increasing the accuracy of in-focus determination. With such an operation performed, advantageous effects similar to those in the above-described exemplary embodiments can be attained.

Other Modification Examples

Moreover, in the third exemplary embodiment, the recording unit 219 of the digital camera and an external computer are electrically interconnected so as to establish a state available for communication. However, the third exemplary embodiment is not limited to this, and a readout apparatus for reading out data from the recording unit 219 of the digital camera and an external computer can be electrically interconnected so as to establish a state available for communication. Furthermore, the third exemplary embodiment is not limited to this, and a configuration in which a wireless communication unit is provided in each of the recording unit 219 of the digital camera or the readout apparatus for reading out data therefrom and the external computer so as to establish a state available for communication without electrical connection can be employed. With such a configuration employed, similar advantageous effects can be attained.

While various exemplary embodiments of the present invention have been described, the present invention is not limited to these exemplary embodiments but can be modified and altered in various manners within the scope of the gist thereof.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-213864, filed Nov. 6, 2017, which is hereby incorporated by reference herein in its entirety.

What is claimed is:

1. An image processing apparatus comprising at least one processor configured to perform operations of the following units:
    a first focus detection unit configured to perform first focus detection on a subject;
    a drive control unit configured to control driving of a focus lens based on a result of the first focus detection;
    a second focus detection unit configured to perform second focus detection of imaging plane phase difference type based on a signal corresponding to image data acquired by a first image sensor, which outputs image data corresponding to a subject image, at a position of the focus lens that is based on control by the drive control unit;
    an evaluation unit configured to evaluate, based on a result of the second focus detection, a focusing state of the image data that is based on an output of the first image sensor; and
    a control unit configured to perform control to record information about the evaluated focusing state in association with the image data.

2. The image processing apparatus according to claim 1, wherein the at least one processor is further configured to perform operations of a setting unit configured to set a first area, which is an area in which the second focus detection unit performs focus detection, with respect to the image data,
    wherein the second focus detection is focus detection that is based on a signal of the image data corresponding to the first area set by the setting unit with respect to the image data.

3. The image processing apparatus according to claim 2, wherein the setting unit sets the first area based on an area of image data corresponding to a position used for focus detection performed in the first focus detection.

4. The image processing apparatus according to claim 2, wherein the at least one processor is further configured to perform operations of a face detection unit configured to detect a face from image data,
    wherein the setting unit sets the first area to an area of the image data corresponding to a position of the face detected by the face detection unit.

5. The image processing apparatus according to claim 4, wherein the setting unit sets the first area based on a motion vector in a case where the face detection unit has not been able to detect a face from an area of the image data corresponding to an area in which a face has been detected during the first focus detection.

6. The image processing apparatus according to claim 4, wherein the at least one processor is further configured to perform operations of a prediction unit configured to predict a focus position corresponding to a position of the subject at timing corresponding to the second focus detection unit,
    wherein the setting unit sets the first area based on an area of image data in which a defocus amount corresponding to a focus position within a predetermined range of the focus position predicted by the prediction unit has been calculated, in a case where the face detection unit has not been able to detect a face from an area of the image data corresponding to an area in which a face has been detected during the first focus detection.

7. The image processing apparatus according to claim 1, wherein the evaluation unit evaluates the focusing state as being closer to an in-focus state in a case where an absolute value of a defocus amount detected by the second detection unit is less than a predetermined threshold value than in a case where the absolute value is not less than the predetermined threshold value.

8. The image processing apparatus according to claim 1, wherein the second focus detection is focus detection which is performed by detecting a phase difference between a pair of a first signal and a second signal having a parallax included in the image data.

9. A control method for an image processing apparatus, the control method comprising:
    performing first focus detection on a subject;
    controlling driving of a focus lens based on a result of the first focus detection;
    performing second focus detection of imaging plane phase difference type based on a signal corresponding to image data acquired by a first image sensor, which outputs image data corresponding to a subject image, at a position of the focus lens that is based on control for driving the focus lens;
    evaluating, based on a result of the second focus detection, a focusing state of the image data that is based on an output of the first image sensor; and
    performing control to record information about the evaluated focusing state in association with the image data.

10. A non-transitory computer-readable storage medium storing computer-executable instructions that, when executed by a computer, cause the computer to perform a control method for an image processing apparatus, the control method comprising:
    performing first focus detection on a subject;
    controlling driving of a focus lens based on a result of the first focus detection;
    performing second focus detection of imaging plane phase difference type based on a signal corresponding to image data acquired by a first image sensor, which outputs image data corresponding to a subject image, at a position of the focus lens that is based on control for driving the focus lens;
    evaluating, based on a result of the second focus detection, a focusing state of the image data that is based on an output of the first image sensor; and
    performing control to record information about the evaluated focusing state in association with the image data.

* * * * *